(12) United States Patent
Yumiki

(10) Patent No.: US 8,031,240 B2
(45) Date of Patent: Oct. 4, 2011

(54) IMAGING DEVICE

(75) Inventor: Naoto Yumiki, Osaka (JP)

(73) Assignee: Panasonic Corporation, Osaka (JP)

( * ) Notice: Subject to any disclaimer, the term of this patent is extended or adjusted under 35 U.S.C. 154(b) by 291 days.

(21) Appl. No.: 11/886,631

(22) PCT Filed: Dec. 8, 2005

(86) PCT No.: PCT/JP2005/022558
§ 371 (c)(1),
(2), (4) Date: Sep. 18, 2007

(87) PCT Pub. No.: WO2006/100804
PCT Pub. Date: Sep. 28, 2006

(65) Prior Publication Data
US 2009/0027510 A1 Jan. 29, 2009

(30) Foreign Application Priority Data
Mar. 18, 2005 (JP) .................. 2005-079303

(51) Int. Cl.
H04N 5/76 (2006.01)
H04N 5/228 (2006.01)
(52) U.S. Cl. ............. 348/231.6; 348/208.1; 348/208.12; 348/208.16
(58) Field of Classification Search ............... 348/208.1, 348/208.2, 208.12, 208.16
See application file for complete search history.

(56) References Cited

U.S. PATENT DOCUMENTS

| | | | |
|---|---|---|---|
| 5,387,936 A | 2/1995 | Katsumoto | |
| 5,900,909 A | 5/1999 | Parulski et al. | |
| 6,115,197 A * | 9/2000 | Funahashi | 359/826 |
| 6,148,149 A * | 11/2000 | Kagle | 396/50 |
| 7,265,790 B2 * | 9/2007 | Battles et al. | 348/374 |
| 7,375,755 B2 * | 5/2008 | Oya et al. | 348/333.02 |
| 2005/0264653 A1 * | 12/2005 | Starkweather et al. | 348/208.3 |
| 2006/0033818 A1 * | 2/2006 | Wada et al. | 348/208.11 |

FOREIGN PATENT DOCUMENTS

| | | |
|---|---|---|
| JP | 59-072879 | 4/1984 |
| JP | 03-222582 | 10/1991 |
| JP | 5-183795 | 7/1993 |
| JP | 06-282001 | 10/1994 |
| JP | 06-300962 | 10/1994 |
| JP | 8-336069 | 12/1996 |
| JP | 2002-207232 | 7/2002 |
| JP | 2004-088439 | 3/2004 |

OTHER PUBLICATIONS

Japanese Notice of Reasons for Rejection issued in Japanese Patent Application No. JP 2007-509143 dated Sep. 17, 2009.

* cited by examiner

Primary Examiner — Sinh Tran
Assistant Examiner — Jason Flohre
(74) Attorney, Agent, or Firm — McDermott Will & Emery LLP

(57) ABSTRACT

Whether a digital camera body (1) is in a horizontal shooting attitude (a) or in either of vertical shooting attitudes (b), (c) is detected by using drive means of an image blurring compensation device. In the case where a focus drive means detects that the digital camera body (1) is either in an upward attitude (d) or in a downward attitude (e), a shooting attitude thereof can be inputted. The inputted shooting attitude is recorded together with an image, whereby the image can be displayed in the same orientation as the image at the time of shooting thereof, even if the image is shot either in the upward attitude (e) or in the downward attitude (e).

6 Claims, 18 Drawing Sheets (a)

(b)

(a)

(b)

(a)

(b)

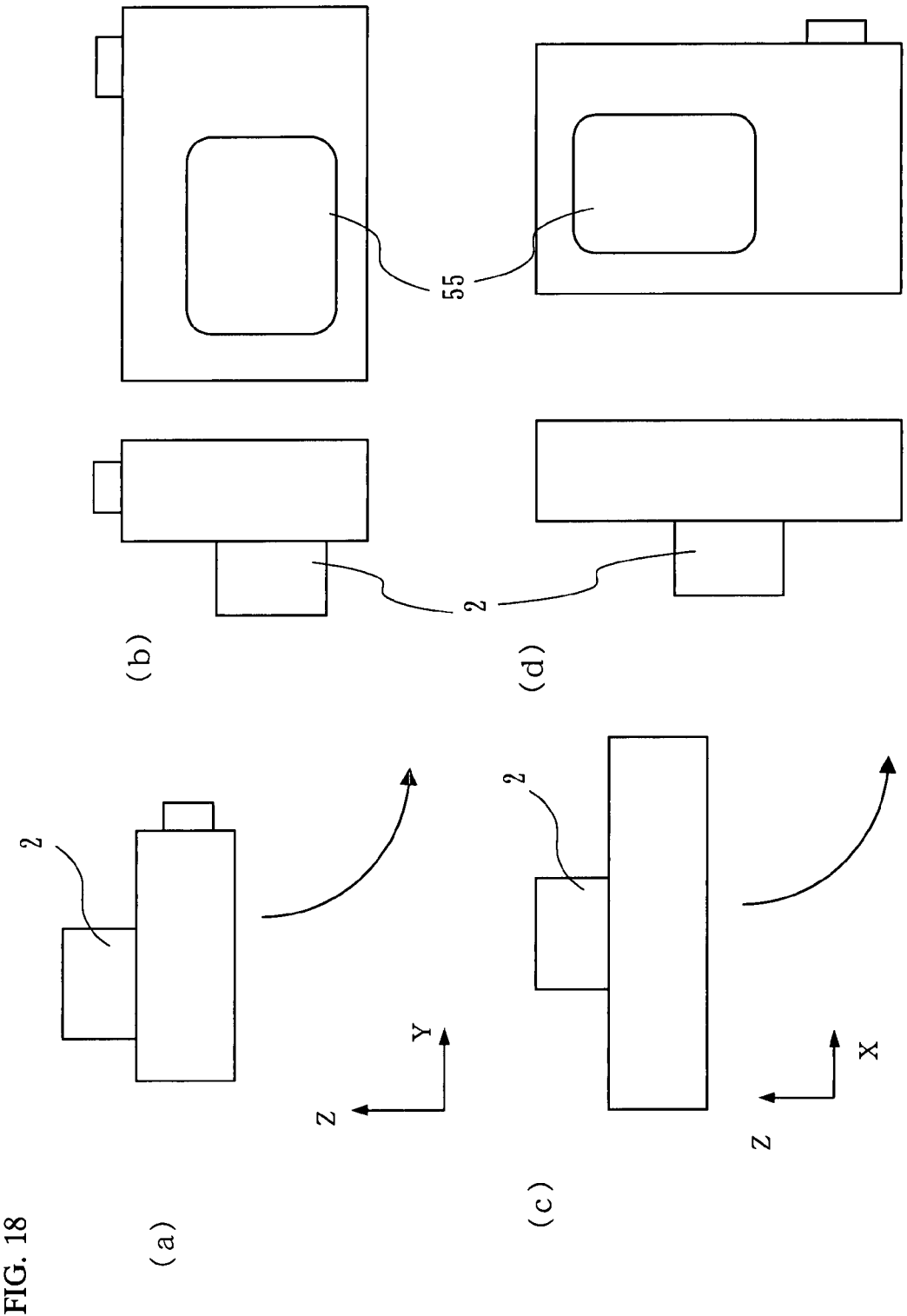

IMAGING DEVICE

RELATED APPLICATIONS

This application is the U.S. National Phase under 35 U.S.C. §371 of International Application No. PCT/JP2005/022558 filed on Dec. 8, 2005, which in turn claims the benefit of Japanese Application No. 2005-079303, filed on Mar. 18, 2005, the disclosures of which Applications are incorporated by reference herein.

TECHNICAL FIELD

The present invention relates to a shooting attitude of an imaging device, and more particularly to an imaging device for accurately determining a shooting state thereof in the case of shooting in an upward attitude or in a downward attitude.

BACKGROUND ART

Recently, an imaging sensor such as a CCD (Charge Coupled Device) and a CMOS (Complementary Metal-Oxide Semiconductor), and a signal processing circuit are increasingly improved in terms of integration density and come to be available inexpensively. Accordingly, a digital still camera and a digital video camera (hereinafter referred to as a "digital camera"), which are capable of converting an optical image of an object into an electrical image signal and outputting the signal, are rapidly growing popular.

With regard to a shooting attitude of a digital camera, in the case where a horizontally long object such as a landscape is to be shot, a photographer holds the digital camera so as to be in a horizontal attitude. In the case where a vertically long object such as a person or a building is to be shot, the object is shot while the digital camera is being held in a vertical attitude.

Note that an attitude of the digital camera, in the case where the direction of a stroke of a shutter button is in parallel with the gravity direction, is referred to as a horizontal shooting attitude. On the other hand, an attitude of the digital camera, in the case where the direction of the stroke of the shutter button is orthogonal to the gravity direction, is referred to as a vertical shooting attitude.

Further, images, which are shot in the respective attitudes as above described, are referred to as a horizontally shot image and a vertically shot image, respectively. In the case where images shot in these two shooting attitudes are to be reproduced and displayed, an attitude detection means is provided to the imaging device so as to match an orientation at the time of shooting and that at the time of reproduction. At the time of shooting, attitude information of the imaging device is written into a shot image, and when the shot image is displayed, the attitude information is read concurrently with the shot image, whereby the image is displayed such that an orientation thereof corresponds to the orientation at the time of shooting.

When the digital camera is in a downward attitude, the digital camera cannot determine whether it is in the horizontal shooting attitude or in the vertical shooting attitude. Therefore, a system is suggested in which, when the digital camera is detected to be in the downward attitude, a photographer inputs either the horizontal shooting attitude or the vertical shooting attitude into the digital camera, whereby a shot image is displayed such that the orientation thereof corresponds to the orientation at the time of shooting (Patent Document 1).

Patent Document 1: Japanese Laid-Open Patent Publication No. 2004-88439

DISCLOSURE OF THE INVENTION

Problems to be Solved by the Invention

A conventional imaging device can detect a downward attitude, but cannot detect an upward attitude. Most of recent digital cameras are adaptable to telephotography, and an opportunity of shooting an airplane flying in the sky or the like is increasing. In such a case, the digital camera needs to be angled upward for shooting. Therefore, in the case of the upward attitude, the digital camera cannot determine whether it is in the horizontal shooting attitude or in the vertical shooting attitude. Further, an attitude detection sensor needs to be provided additionally, which leads to a problem of a cost increase.

Therefore, an object of the present invention is to provide an imaging device capable of accurately determining whether the imaging device is in the horizontal shooting attitude or in the vertical shooting attitude regardless of the upward attitude or the downward attitude thereof.

Solution to the Problems

The object of the present invention is achieved with an imaging device having aspects as follows. As a specific example, an imaging device for outputting an optical image of an object as an electrical image signal includes an imaging optical system for generating the optical image of the object; imaging means for receiving the optical image generated by the imaging optical system and converting the optical image into the electrical image signal; first attitude detection means for detecting whether the imaging device is in a horizontal attitude or in a vertical attitude at the time of shooting, and generating an attitude determination signal; second attitude detection means for detecting whether the imaging device is in an upward attitude or in a downward attitude at the time of shooting; and image recording means for recording the attitude determination signal, together with a shot image outputted from the imaging means, in accordance with a detection result of the second attitude detection means when the imaging device is either in the upward attitude or in the downward attitude.

Based on this configuration, a horizontal shooting attitude, two vertical shooting attitudes, the upward attitude, and the downward attitude of a body of a digital camera are detected, whereby even in the case of shooting by using the digital camera in the upward attitude or in the downward attitude, it is possible for both of an image shot in the horizontal shooting attitude and an image shot in the vertical shooting attitude each to make an orientation of the image at the time of shooting correspond to an orientation of the image at the time of displaying thereof without a mistake.

As a specific example, attitude input means for inputting information indicating whether the imaging device is in the horizontal attitude or in the vertical attitude may be provided. The attitude determination signal indicative of the horizontal attitude and the vertical attitude may be written into the shot image by the attitude input means.

Based on this configuration, the attitude determination signal can be written into the shot image in each of the horizontal shooting attitude and the vertical shooting attitude.

As a specific example, the attitude determination signal may be written into the shot image after detection of whether the imaging device is in the upward attitude or in the downward attitude and subsequent detection of whether the imaging device is in the horizontal attitude or in the vertical attitude.

Based on this configuration, the attitude determination signal can be automatically written into the shot image in each of the horizontal shooting attitude and the vertical shooting attitude.

As a specific example, the imaging device may include an image blurring compensation device for detecting vibration applied to the imaging device, and driving a compensation lens of the imaging optical system in two directions which are orthogonal to an optical axis. And, the first attitude detection means may determine an attitude of the imaging device by detecting a signal for driving the compensation lens.

Based on this configuration, the imaging device including the image blurring compensation device can detect the attitude of the imaging device without adding a new structure for detecting the horizontal attitude or the vertical attitude of the imaging device at the time of shooting.

As a specific example, the imaging device may include the image blurring compensation device for detecting vibration applied to the imaging device, and driving a compensation lens of the imaging optical system in two directions which are orthogonal to an optical axis. The image blurring compensation device may include a first actuator and a second actuator for driving the compensation lens, and the detection means may determine the attitude of the imaging device in accordance with a value of a driving current of at least one of the first actuator and the second actuator.

Based on this configuration, the attitude of the imaging device can be detected easily by detecting the value of the driving current of at least one of the first actuator and the second actuator.

As a specific example, the imaging device may include a linear actuator for driving a focus lens unit, and the second attitude detection means may determine the attitude of the imaging device by detecting a signal for driving the focus lens unit.

Based on this configuration, the imaging device including the linear actuator can detect the attitude of the imaging device without adding a new structure for detecting the horizontal attitude or the vertical attitude of the imaging device at the time of shooting.

As a specific example, in the case where the imaging device is in the upward attitude, the focus lens unit may be moved so as to focus on an infinite position.

Based on this configuration, the focus lens unit can be driven so as to focus on the infinite position, whereby it is possible to perform a quick shooting.

As a specific example, in the case where the imaging device is in the downward attitude, the focus lens unit may be moved to a position for a macro shooting.

Based on this configuration, the focus lens unit can be driven to the position for the macro shooting, whereby it is possible to perform a quick shooting.

EFFECT OF THE INVENTION

As above described, according to an imaging device based on the present invention, by detecting an horizontal shooting attitude, two vertical shooting attitudes, an upward attitude and a downward attitude of an digital camera body, it is possible for both of an image shot in the horizontal shooting attitude and an image shot in the vertical shooting attitude each to make an orientation at the time of shooting correspond to an orientation of the image at time of display, without a mistake, even if the digital camera is used in the upward attitude or in the downward attitude for shooting.

BRIEF DESCRIPTION OF THE DRAWINGS

FIG. 18 is a diagram illustrating a change in an attitude of a camera after shooting according to embodiment 2 of the present invention.

Figure 1:
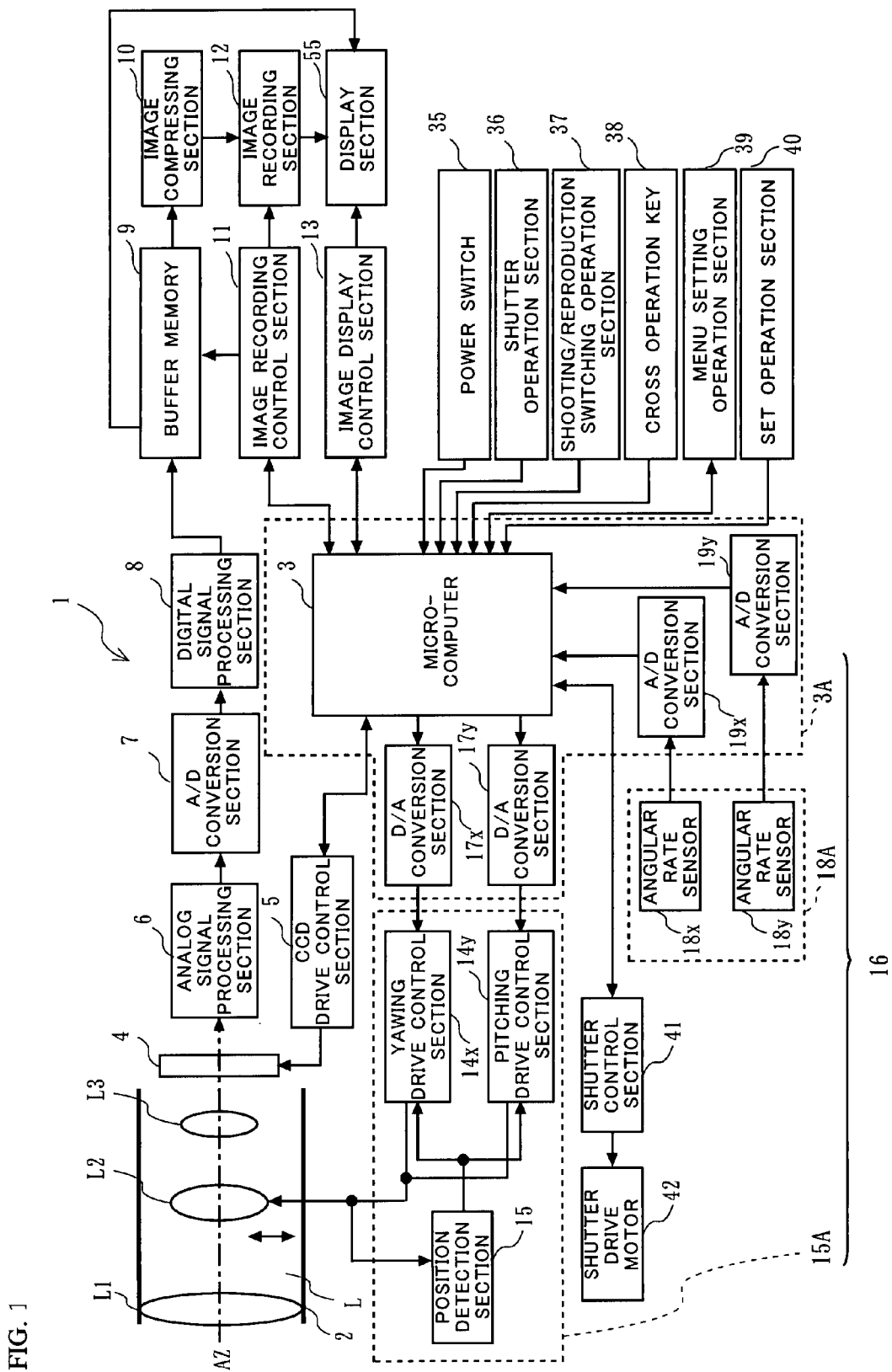
FIG. 1 is a block diagram showing a control system of an imaging device according to embodiment 1 of the present invention.

DESCRIPTION OF THE REFERENCE CHARACTERS 1 digital camera
1a housing
2 lens barrel 3 microcomputer
3A signal processing section
4 imaging sensor
5 CCD drive control section
6 analog signal processing section
7 A/D conversion section
8 digital signal processing section
9 buffer memory
10 image compressing section
11 image recording control section
12 image recording section
13 image display control section
14x yawing drive control section
14y pitching drive control section
15 position detection section
16 image blurring compensation device
15A motion compensation section
17x,17y D/A conversion section
18A motion detection section
18x yawing angular rate sensor
18y pitching angular rate sensor
19x,19y A/D conversion section
20 image blurring compensation mechanism
21 pitching holding frame
22 yawing holding frame
23 pitching shaft
24x,24y coil
25 fixing frame
26a,26b yawing shaft
27x,27y magnet
28x,28y yoke
29x,29y actuator
30 light-emitting element
31 photo-detecting element
32A shooting attitude detection section
32x yawing current value detection section
32y pitching current value detection section
35 power switch
36 shutter operation section
37 shooting/reproduction switching operation section
38 cross operation key
39 MENU setting operation section
40 SET operation section
41 shutter control section
42 shutter drive motor
50 internal memory
51 removable memory
55 display section
57 zoom operation section
60 attitude determination signal
72 focusing current value detection section
83 linear actuator
84 stator
85 main magnet
86 main yoke
87 side yoke
88 magnetic circuit
89 movable element
90 coil
L imaging optical system
L1 first lens unit
L2 second lens unit
L3 third lens unit

BEST MODE FOR CARRYING OUT THE INVENTION

Embodiment 1

FIG. 1 is a block diagram showing a general configuration of a digital camera 1 according to embodiment 1 of the present invention. The digital camera 1 includes an imaging optical system L, a microcomputer 3, an imaging sensor 4, a CCD drive control section 5, an analog signal processing section 6, an A/D conversion section 7, a digital signal processing section 8, a buffer memory 9, an image compressing section 10, an image recording control section 11, an image recording section 12, an image display control section 13, a display section 55, a shutter control section 41, and a shutter drive motor 42.

The imaging optical system L is an optical system including three lens units L1, L2 and L3. A first lens unit L1 and a second lens unit L2 (an image blurring compensation lens unit) move in an optical axis direction, whereby zooming is performed. A third lens unit L3 (a focus lens unit) moves in the optical axis direction, whereby focusing is performed. Further, the second lens unit L2 is a compensation lens unit, and plays a role of compensating a movement of an image by moving on a plane orthogonal to the optical axis so as to decenter the optical axis.

When a mechanical vibration or a jiggle caused by a photographer is applied to the digital camera 1, an optical axis of light emitted from an object to a lens is misaligned with respect to an optical axis of the lens. Therefore, an image to be obtained in such a case will be a blurred image. A preventive mechanism provided against this is called an image blurring compensation mechanism. Note that the image blurring compensation mechanism can be also used as attitude detection means of the digital camera 1 in the present embodiment. A structure and an operation thereof will be described later.

The microcomputer 3 controls the whole of various control sections of the digital camera 1. Further, the microcomputer 3 is capable of receiving respective signals from a power switch 35, a shutter operation section 36, a shooting/reproduction switching operation section 37, a cross operation key 38, a MENU setting operation section 39, and a SET operation section 40.

In response to a timing signal generated by an operation of the shutter operation section 36, the shutter control section 41 drives the shutter drive motor 42 in accordance with a control signal outputted by the microcomputer 3, and then actuates a shutter.

The imaging sensor 4 is preferably configured with a CCD, and converts an optical image formed by an imaging optical system L into an electrical signal. The imaging sensor 4 is drive-controlled by the CCD drive control section 5. The imaging sensor 4 may be configured with a CMOS.

An image signal outputted by the imaging sensor 4 is processed through the analog signal processing section 6, the A/D conversion section 7, the digital signal processing section 8, the buffer memory 9 and the image compressing section 10 sequentially. In the analog signal processing section 6, the image signal outputted by the imaging sensor 4 is subject to analog signal processing such as gamma processing. The A/D conversion section 7 converts an analog signal outputted by the analog signal processing section 6 into a digital signal. In the digital signal processing section 8, the image signal converted into the digital signal by the A/D conversion section 7 is subject to digital signal processing such as noise reduction and edge enhancement. The buffer memory 9 is a RAM (Random Access Memory), and temporarily stores the image signal processed by the digital signal processing section 8.

Further, the image signal stored in the buffer memory 9 is processed through the image compressing section 10 to the image recording section 12 sequentially. The image signal stored in the buffer memory 9 is transmitted to the image compressing section 10 in accordance with a command issued by the image recording control section 11, and data of the image signal is compressed to a predetermined size. In this case, the image signal is compressed, at a predetermined rate, into a smaller data size than the original data. As an exemplary compression method, a JPEG (Joint Photographic Experts Group) method may be used. Concurrently, the image compressing section 10 generates a reduced image signal which corresponds to a shot image used for thumbnail display or the like. The compressed image signal and the reduced image signal are transmitted to the image recording section 12 thereafter.

The image recording section 12 is constituted of an internal memory 50 (not shown), which is provided to the digital camera 1, and/or the removable memory 51. In accordance with a command issued by the image recording control section 11, the image recording section 12 interrelates and records the image signal, the reduced image signal corresponding thereto, and predetermined information to be recorded. The predetermined information to be recorded together with the image signal includes a date when an image was shot, focal length information, shutter speed information, aperture value information, shooting mode information, and attitude information of the digital camera 1 which is described later.

The image display control section 13 is controlled by a control signal transmitted by the microcomputer 3. In accordance with a command from the image display control section 13, the display section 55 displays the image signal stored in the image recording section 12 or the buffer memory 9 as a visible image. As display modes, the display section 55 has a mode for display an image signal only and a mode for displaying information at the time of shooting of the image signal. The information at the time of shooting of the image signal includes the focal length information, the shutter speed information, the aperture value information, the shooting mode information, in-focus state information and the attitude information. These pieces of information are displayed by operating the MENU setting operation section 39.

Figure 2:
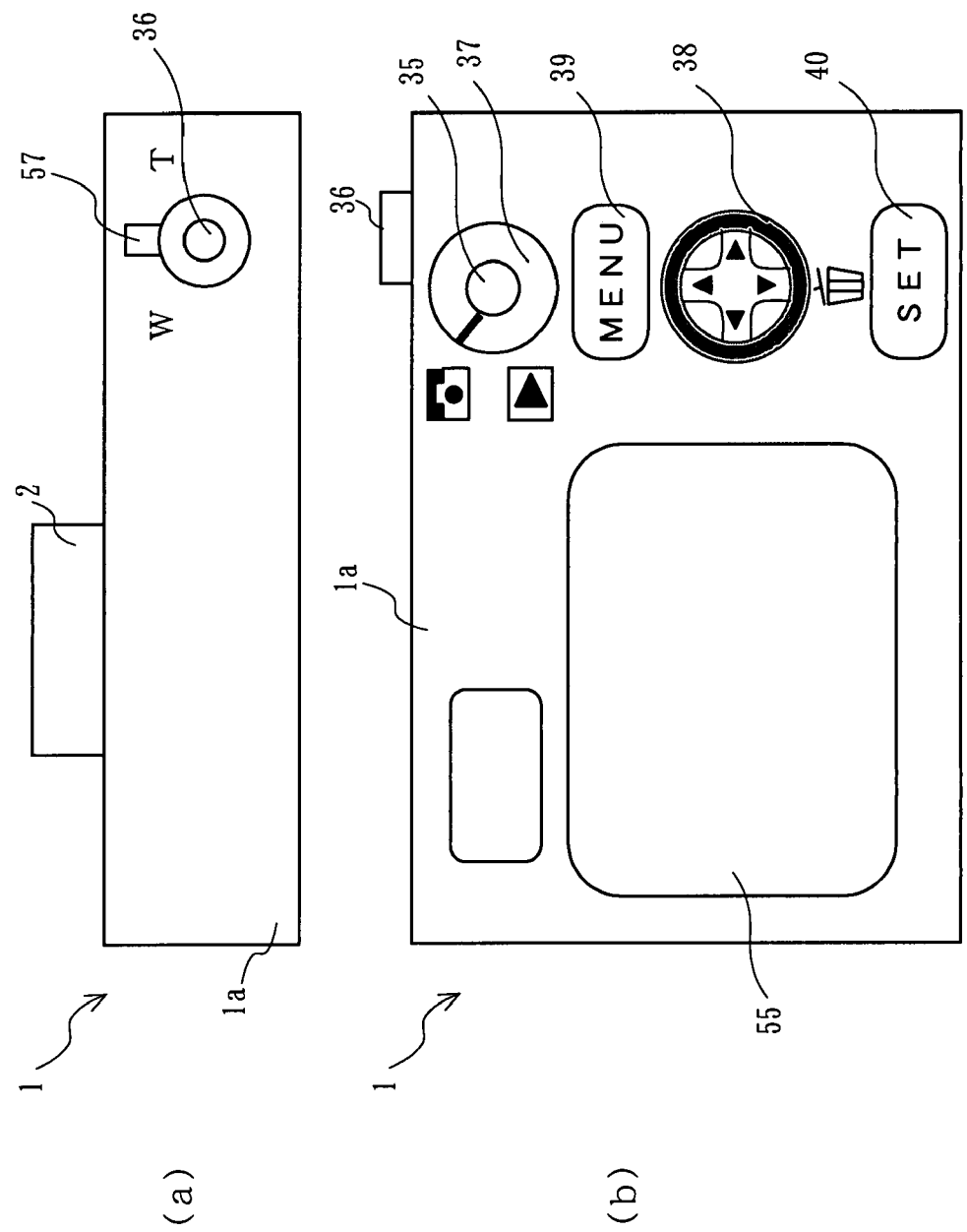
FIG. 2 is a diagram showing a top and a back of the imaging device according to embodiment 1 of the present invention.

Next, a configuration of the digital camera 1 according to embodiment 1 will be described, with reference to FIG. 2. FIG. 2(a) is a top view of the digital camera 1, and FIG. 2(b) is a back view of the digital camera 1.

The housing 1a has situated on a front surface thereof an imaging optical system including a lens 2, and also has situated on a back surface thereof the power switch 35, the shooting/reproduction switching operation section 37, the cross operation key 38, the MENU setting operation section 39, the SET operation section 40, and the display section 55 which is constituted of an LCD monitor. Further, the housing 1a has situated on a top surface thereof the shutter operation section 36 and a zoom operation section 57.

The zoom operation section 57 is rotatably located in the vicinity of the shutter operation section 36 so as to be coaxial with the shutter operation section 36. The power switch 35 is an operation member for turning the power of the digital camera 1 ON/OFF. The shooting/reproduction switching operation section 37 is an operation member for switching between a shooting mode and a reproduction mode, and every time a lever thereof is rotated, mode switching is performed.

Under the condition that the shooting mode is selected, in the case where the zoom operation section 57 is rotated to the right direction, the imaging optical system L is controlled by the microcomputer 3 so as to be telephoto, whereas in the case where the zoom operation section 57 is rotated to the left direction, the imaging optical system L is controlled by the microcomputer 3 so as to be wide angle.

The MENU setting operation section 39 is an operation member for displaying various menus on the display section 55. The cross operation key 38 is an operation member for selecting, based on pressing of any one portion of up, down, right and left portions thereof, any one of the various operation menus displayed on the display section 55 in accordance with the operation of the MENU setting operation section 39. When any one of the various operation menus is selected based on the operation of the cross operation key 38, the microcomputer 3 issues a command for executing an operation corresponding to an operation menu having been selected. The SET operation section 40 is an operation member for returning the display of the various operation menus to a state prior to such display.

Figure 3:
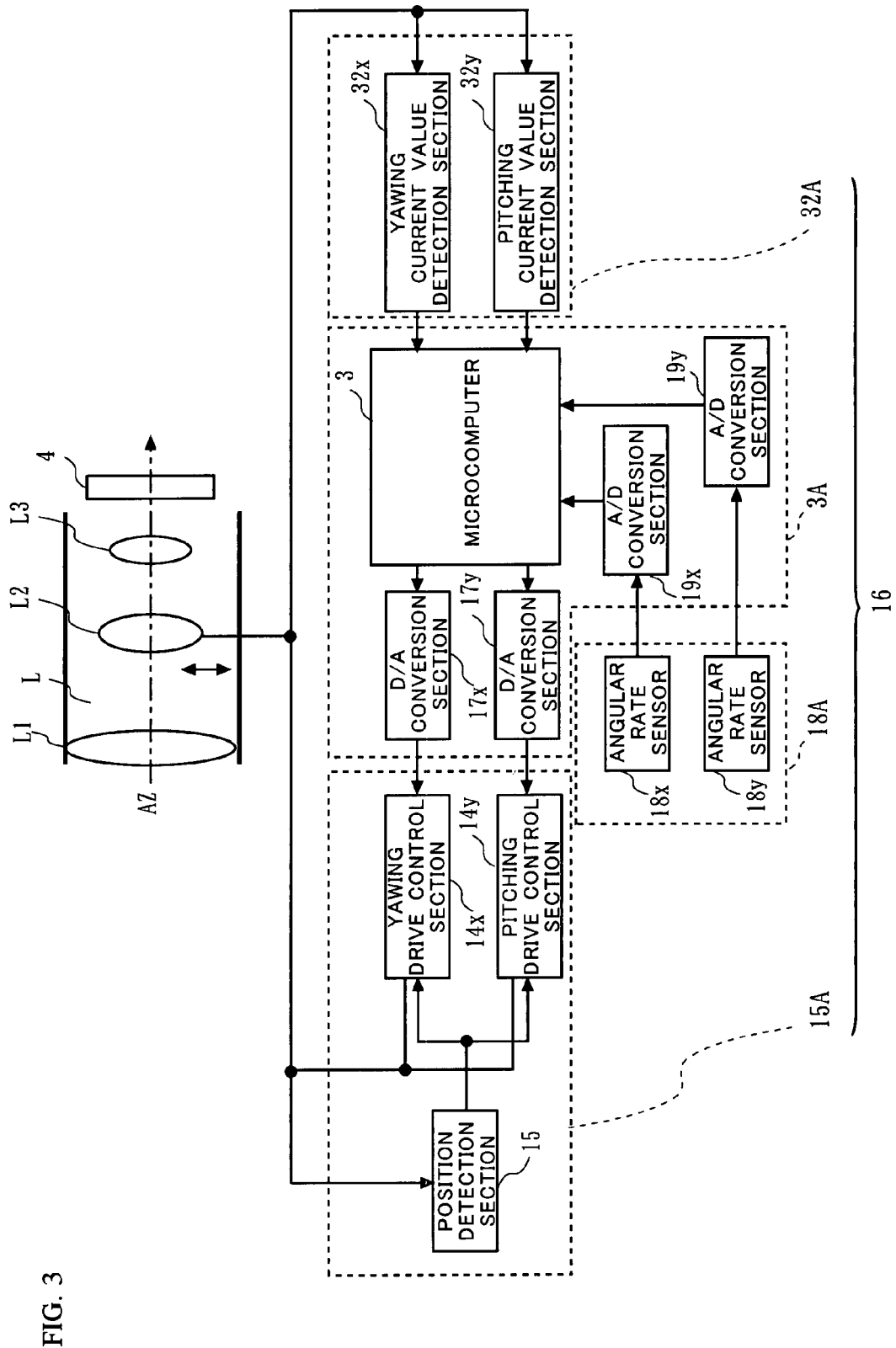
FIG. 3 is a block diagram showing a control system of an image blurring compensation device of the imaging device according to embodiment 1 of the present invention.

Next, with reference to FIG. 3, a control system of an image blurring compensation device will be described. As shown in FIG. 3, an image blurring compensation device 16 includes a motion compensation section 15A, a shooting attitude detection section 32A, a motion detection section 18A, and a signal processing section 3A. The motion compensation section 15A for controlling an optical axis AZ of imaging light includes the second lens unit L2, a yawing drive control section 14x, a pitching drive control section 14y and a position detection section 15. The second lens unit L2 moves on a plane orthogonal to the optical axis AZ so as to decenter the optical axis, and thereby functioning as a compensation lens unit for compensating a movement of an image. The second lens unit L2 is drive-controlled in two directions (X and Y directions), which are orthogonal to the optical axis AZ, by the yawing drive control section 14x and the pitching drive control section 14y. Hereinafter the X direction is referred to as a "yawing direction", and the Y direction is referred to as a "pitching direction". The position detection section 15 detects a position of the second lens unit L2, and forms a feedback control loop for controlling the second lens unit L2 in combination with the yawing drive control section 14x and the pitching drive control section 14y.

The shooting attitude detection section 32A includes a yawing current value detection section 32x and a pitching current value detection section 32y. The yawing current value detection section 32x detects a value of a current which is applied to a coil when the yawing actuator 29x described later is actuated. In a similar manner, the pitching current value detection section 32y detects a value of a current which is applied to the coil when the pitching actuator 29y is actuated.

The motion detection section 18A includes a yawing angular rate sensor 18x and a pitching angular rate sensor 18y. The yawing angular rate sensor 18x and the pitching angular rate sensor 18y are each a sensor for detecting a movement of the imaging device including the imaging optical system L, the movement being caused by a hand blur or other vibration. The yawing angular rate sensor 18x and the pitching angular rate sensor 18y detect movements in the yawing and pitching directions, respectively. The yawing angular rate sensor 18x and the pitching angular rate sensor 18y each outputs positive and negative angular rate signals depending on the direction in which the digital camera 1 moves, using an output during the digital camera 1 being in a static state as a reference. The outputted signal is processed by the signal processing section.

The signal processing section 3A includes the microcomputer 3 D/A conversion sections 17x and 17y, and A/D conversion sections 19x and 19y. Signals outputted by the yawing angular rate sensor 18x and the pitching angular rate sensor 18y, respectively, is processed with filtering processing, amplification processing, and the like, converted into a digital signal by the A/D conversion sections 19x and 19y, respectively, and then provided to the microcomputer 3. The microcomputer 3 allows the signals, which are, respectively, outputted by the yawing angular rate sensor 18x and the pitching angular rate sensor 18y and inputted via the A/D conversion sections 19x and 19y, to be subject to various types of processing such as filtering, an integrating process, phase compensation, gain adjustment, clipping and the like.

Based on the above-described various types of processing, the microcomputer 3 calculates an amount of drive-control of the second lens unit L2, which is necessary for motion compensation, thereby generating a control signal. The generated control signals are, respectively, outputted to the yawing drive control section 14x and the pitching drive control section 14y via the D/A conversion sections 17x and 17y. Accordingly, the yawing drive control section 14x and the pitching drive control section 14y drive the second lens unit L2 in accordance with the control signals, thereby compensate a movement of an image.

Figure 4:
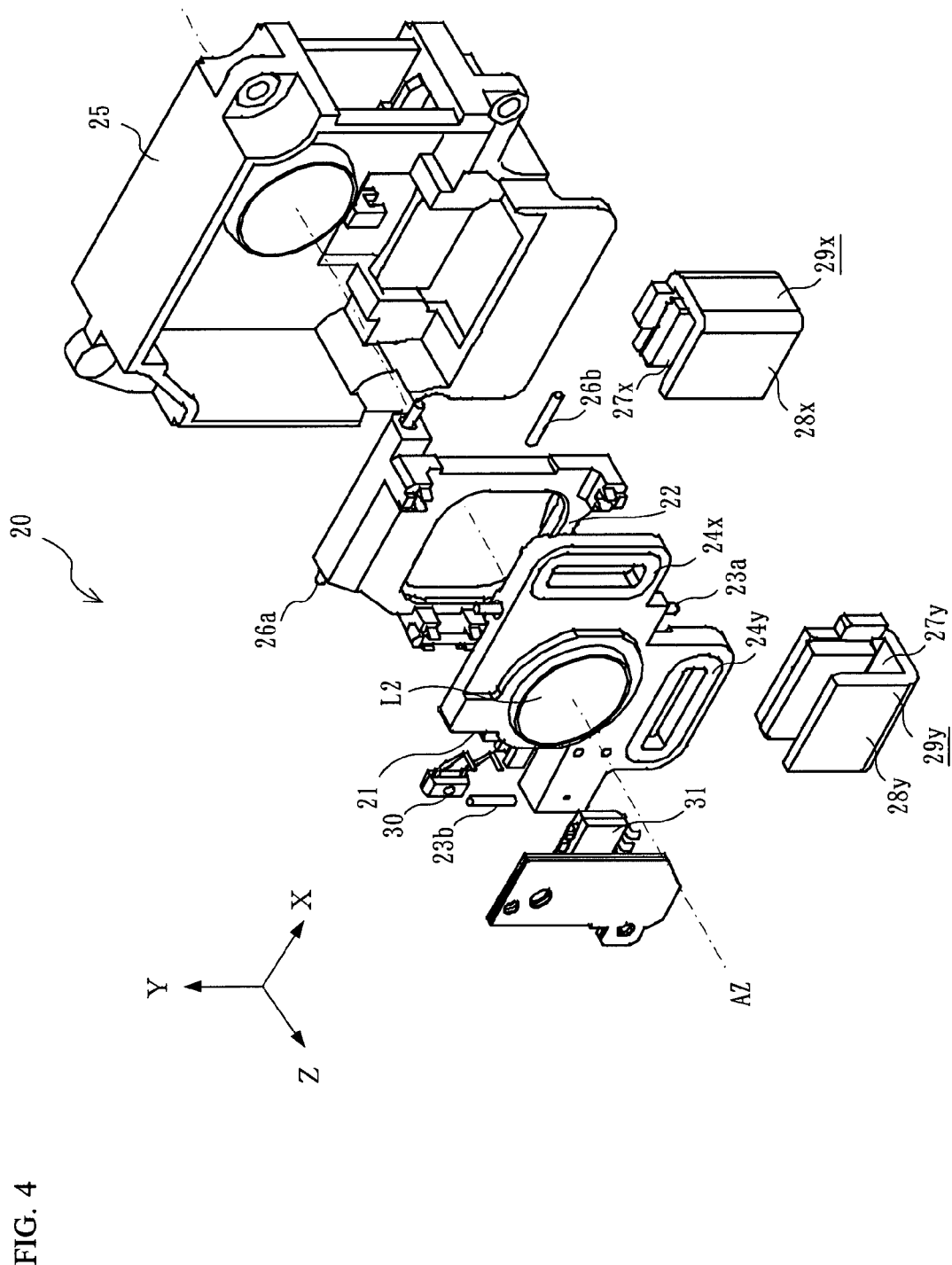
FIG. 4 is an exploded perspective view showing an image blurring compensation mechanism of the imaging device according to embodiment 1 of the present invention.

Next, with reference to FIG. 4, a configuration of an image blurring compensation mechanism 20 of the image blurring compensation device 16 used in the present embodiment will be described. As shown in FIG. 4, the image blurring compensation mechanism 20 includes a pitching holding frame 21, a yawing holding frame 22, a fixing frame 25, a yawing actuator 29x, a pitching actuator 29y, a light-emitting element 30, and a photo-detecting element 31.

The pitching holding frame 21 has coils 24x and 24y. The second lens unit L2 and the light-emitting element 30 are fixed to the pitching holding frame 21. The pitching holding frame 21 is coupled to the yawing holding frame 22 via pitching shafts 23a and 23b so as to be slidable in the Y direction.

The yawing holding frame 22 is coupled to the fixing frame 25 via yawing shafts 26a and 26b so as to be slidable in the X direction.

The yawing actuator 29x has a magnet 27x and a yoke 28x, and is coupled to the fixing frame 25. In a similar manner, the pitching actuator 29y has a magnet 27y and a yoke 28y, and is coupled to the fixing frame 25.

The photo-detecting element 31 is fixed to the fixing frame 25, receives light emitted from the light-emitting element 30, and detects two-dimensional position coordinates. When a photographer shoots, the image blurring compensation device 16 causes the yawing angular rate sensor 18x and the pitching angular rate sensor 18y to detect a hand blur applied to the digital camera 1. The microcomputer 3, thereafter, issues a command so as to compensate the detected hand blur. A current is supplied from an external circuit to the respective coils 24x and 24y of the pitching holding frame 21. The actuators 29x and 29y each forms a magnetic circuit. The pitching holding frame 21 moves on a place defined by two of the X direction and the Y directions (referred to as an "XY-plane") which are orthogonal to the optical axis AZ.

Further, a position of the pitching holding frame 21 is detected by the photo-detecting element 31, whereby it is possible to perform highly accurate position detection. In other words, the second lens unit L2 is moved on the XY-plane orthogonal to the optical axis AZ by using the image blurring compensation mechanism 20, whereby it is possible to compensate an image which is incident on the imaging sensor 4 through the imaging optical system L. It is also possible to shoot a high quality image while suppressing blurring caused by the hand blur.

Figure 8:
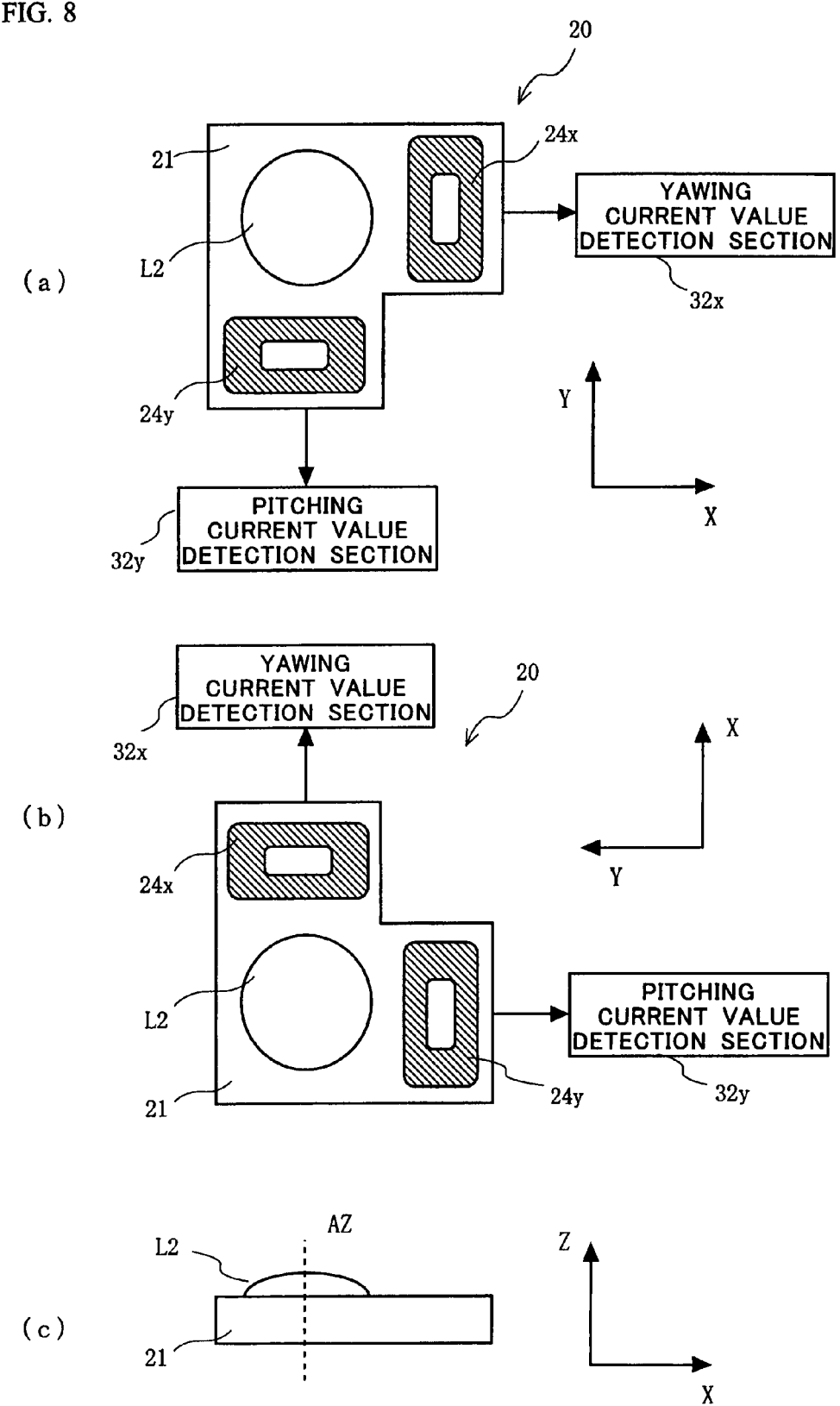
FIG. 8 is a diagram illustrating detection of an attitude of the image blurring compensation mechanism according to embodiment 1 of the present invention.

Next, with reference to FIGS. 8 and 9, a method of detecting the value of the current by using the yawing current value detection section 32x and the pitching current value detection section 32y will be described. FIG. 8 shows an attitude of the image blurring compensation mechanism 20. More specifically, FIG. 8(a) shows an attitude of the image blurring compensation mechanism 20 at the time of shooting in a horizontal shooting attitude, and FIG. 8(b) shows an attitude of the image blurring compensation mechanism 20 at the time of shooting in a vertical shooting attitude 1. FIG. 8(c) shows an appearance of the pitching holding frame 21 as viewed along the Y direction.

In the case of the horizontal shooting attitude as shown in FIG. 8(a), a weight of each of the second lens unit L2, the pitching holding frame 21, the coils 24x and 24y, and the yawing holding frame 22 is applied in the Y direction, which is the gravity direction. In this case, the second lens unit L2 needs to be retained and centered on the optical axis so as to obtain an appropriate image. Accordingly, an electromagnetic force needs to be generated so as to support a self-weight of the second lens unit L2. In order to generate a necessary electromagnetic force, a current Iy1 is supplied to the coil 24y. On the other hand, in the X direction, since the second lens unit L2 is retained and centered on the optical axis, it is not necessary to consider a force supporting the self-weight thereof. Therefore, a value of a current Ix2 supplied to the coil 24x is smaller than the value of the current Iy1 supplied to the coil 24y.

FIG. 8(b) shows an attitude of the image blurring compensation mechanism 20 in a vertical shooting attitude which is rotated 90 degrees from the horizontal shooting attitude around the optical axis. The weight of each of the second lens unit L2, the pitching holding frame 21, the coils 24x and 24y, and the yawing holding frame 22 is applied in X direction, which is the gravity direction. In this case, the second lens unit L2 needs to be retained and centered on the optical axis. Therefore, the electromagnetic force to support a self-weight of the yawing holding frame 22 in addition to the self-weight of the second lens unit L2 needs to be generated in the X direction.

Accordingly, in order to generate a necessary electromagnetic force, a current Ix1 is supplied to the coil 24x. In consideration of the self-weight of the yawing holding frame 22, a value of the current Ix1 is larger than a value of the current Iy1 supplied to the coil 24y in the case of the horizontal shooting attitude. On the other hand, in the y direction, it is not necessary to consider a force to support the self-weight of the second lens unit L2 so as to hold the second lens unit L2 centered on the optical axis, and thus a value of a current Iy2 supplied to the coil 24y is smaller than the value of the current Ix1 supplied to the coil 24x.

As above described, the value of the current supplied to each of the coils 24x and 24y is determined depending on a shooting attitude of the digital camera 1. In other words, it is possible to determine the shooting attitude of the image blurring compensation mechanism 20 and the digital camera 1 by detecting the value of the current passing through each of the coils 24x and 24y. Therefore, it is possible to use the image blurring compensation mechanism 20 not only as a function for preventing image blurring but also as means for detecting the attitude of the digital camera 1.

Figure 7:
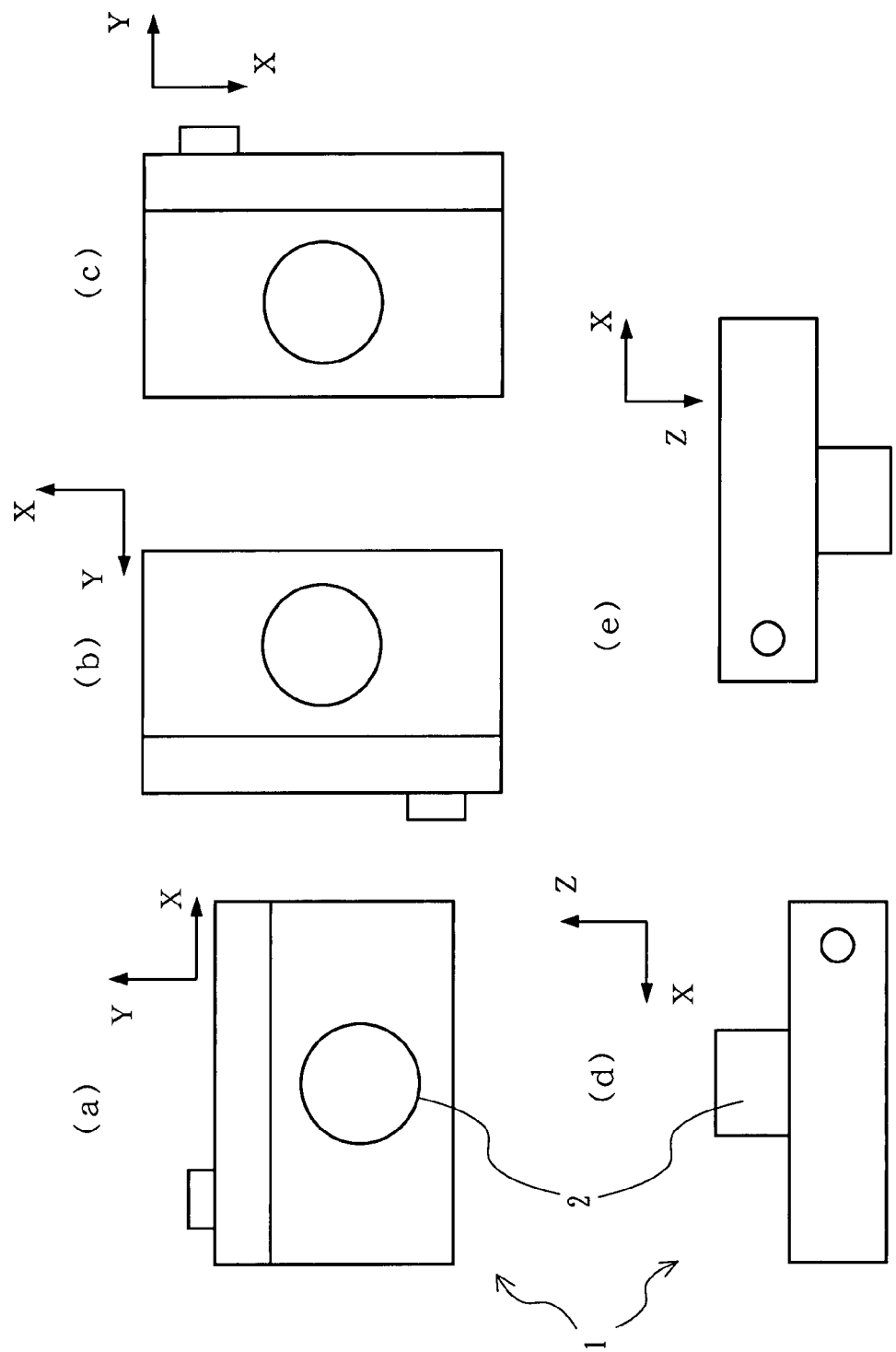
FIG. 7 is a diagram showing various attitudes of the imaging device according to embodiment 1 of the present invention.

Further, the shooting attitude of the digital camera 1 is determined as described below. Suppose that the digital camera 1 in the horizontal shooting attitude is a reference attitude, and that an angle in this attitude is 0 degree. In other words, a state shown in FIG. 7(a) is the horizontal shooting attitude. An attitude of the digital camera 1 in a vertical shooting position is a state in which the digital camera 1 is rotated by 90 degrees or −90 degrees from the horizontal shooting attitude around the optical axis. A state shown in FIG. 7(b) is a vertical shooting attitude 1 rotated by 90 degrees, and a state shown in FIG. 7(c) is a vertical shooting attitude 2 rotated by −90 degrees.

Next, a case where a photographer is to shoot a horizontally oriented object such as a landscape in the horizontal shooting attitude will be described. The attitude of the digital camera 1 is determined based on the value of the current detected by each of the yawing current value detection section 32x and the pitching current value detection section 32y.

In the case of shooting in a horizontal shooting attitude as shown in FIG. 7(a), that is, in a 0 degree attitude, the yawing current value detection section 32x and the pitching current value detection section 32y respectively detect values of the current Ix2 and the current Iy1 respectively passing through the coil 24x and the coil 24y of the image blurring compensation mechanism 20. According to the values of the currents, the microcomputer 3 determines that the digital camera 1 is situated in the horizontal shooting attitude. In this state, the photographer presses the shutter operation section 36, and shoots the object. An image having been shot is recorded in the image recording section 12.

Figure 10:
FIG. 10 is a diagram illustrating an attitude determination signal of the imaging device in each of the shooting attitudes according to embodiment 1 of the present invention.

In this case, as shown in FIG. 10, the image recording control section 11 adds an attitude determination signal 60 (0), which indicates that the shooting attitude of the digital camera 1 is at 0 degree, to an image signal outputted by the buffer memory 9. This attitude determination signal 60 is recorded, for example, on a header portion or a footer portion of the image signal. The attitude determination signal 60 may be recorded either in the buffer memory 9 or in the image recording section 12.

Figure 11:
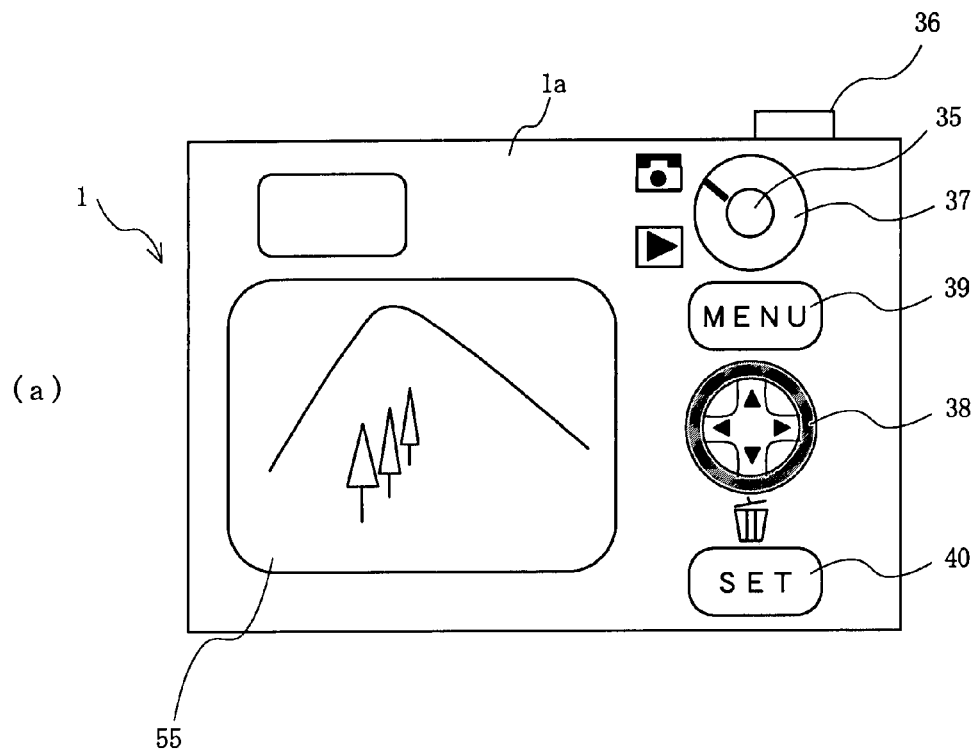
FIG. 11 is a diagram illustrating a method of displaying, on a display section, an image shot by the imaging device according to embodiment 1 of the present invention.
Figure 11:
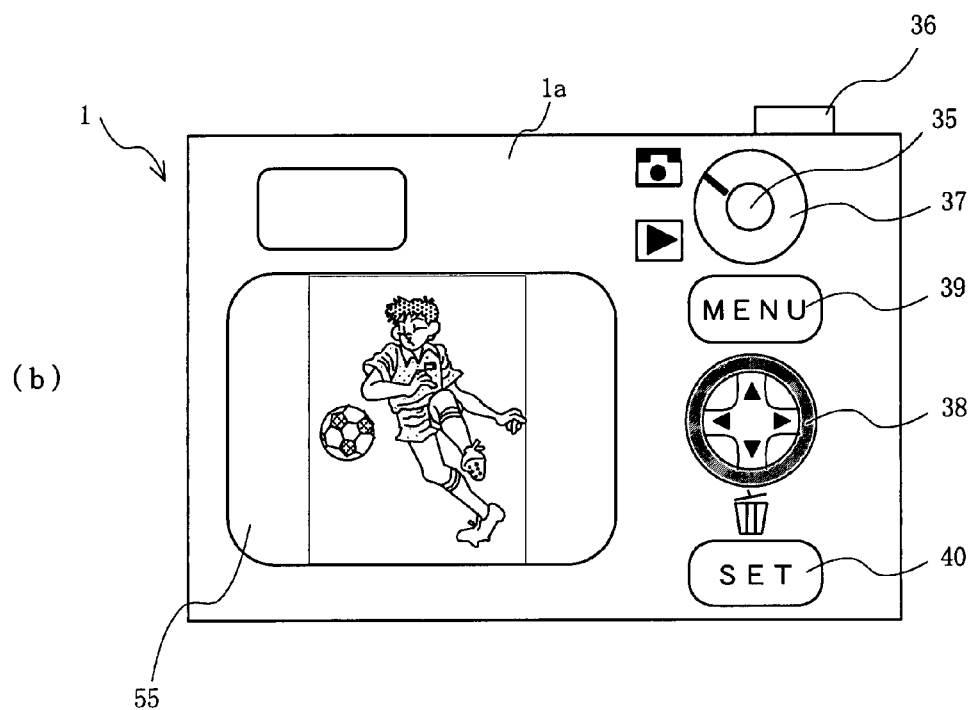

Accordingly, at the time of reproduction, the attitude determination signal 60 (0) recorded on the shot image is read, whereby an image having been shot in the horizontal shooting attitude is displayed such that an orientation of an image to be displayed corresponds to an orientation of the image at the time of shooting with the digital camera 1 as shown in FIG. 11(a).

On the other hand, in the case where the photographer shoots a vertically oriented object such as a person while keeping the digital camera 1 in the vertical shooting attitude, as with the case of the horizontal shooting attitude, the attitude of the digital camera 1 is determined based on the value of the current detected by each of the yawing current value detection section 32x and the pitching current value detection section 32y.

In the case of shooting in the vertical shooting attitude, that is, in a 90 degree attitude as shown in FIG. 7(b), the yawing current value detection section 32x and the pitching current value detection section 32y detect the values of the current Ix1 and the current Iy2 respectively passing through the coil 24x and the coil 24y of the image blurring compensation mechanism 20. Based on the values of the currents, the microcomputer 3 determines that the attitude of the digital camera 1 is the vertical shooting attitude 1. In this state, the photographer presses the shutter operation section 36, and shoots the object. The shot image is recorded in the image recording section 12. In this case, the image recording control section 11 adds, to an image signal outputted by the buffer memory 9, an attitude determination signal 60 (1) which indicates that the shooting attitude of the digital camera 1 is the vertical shooting attitude rotated by 90 degrees from the horizontal shooting attitude around the optical axis.

Accordingly, at the time of reproduction, the attitude determination signal 60 (1) recorded on the shot image is read, whereby an image having been shot in the vertical shooting attitude 1 is rotated by −90 degrees and displayed such that an orientation of an image to be displayed corresponds to an orientation of the image at the time of shooting with the digital camera 1 as shown in FIG. 11(b).

Figure 9:
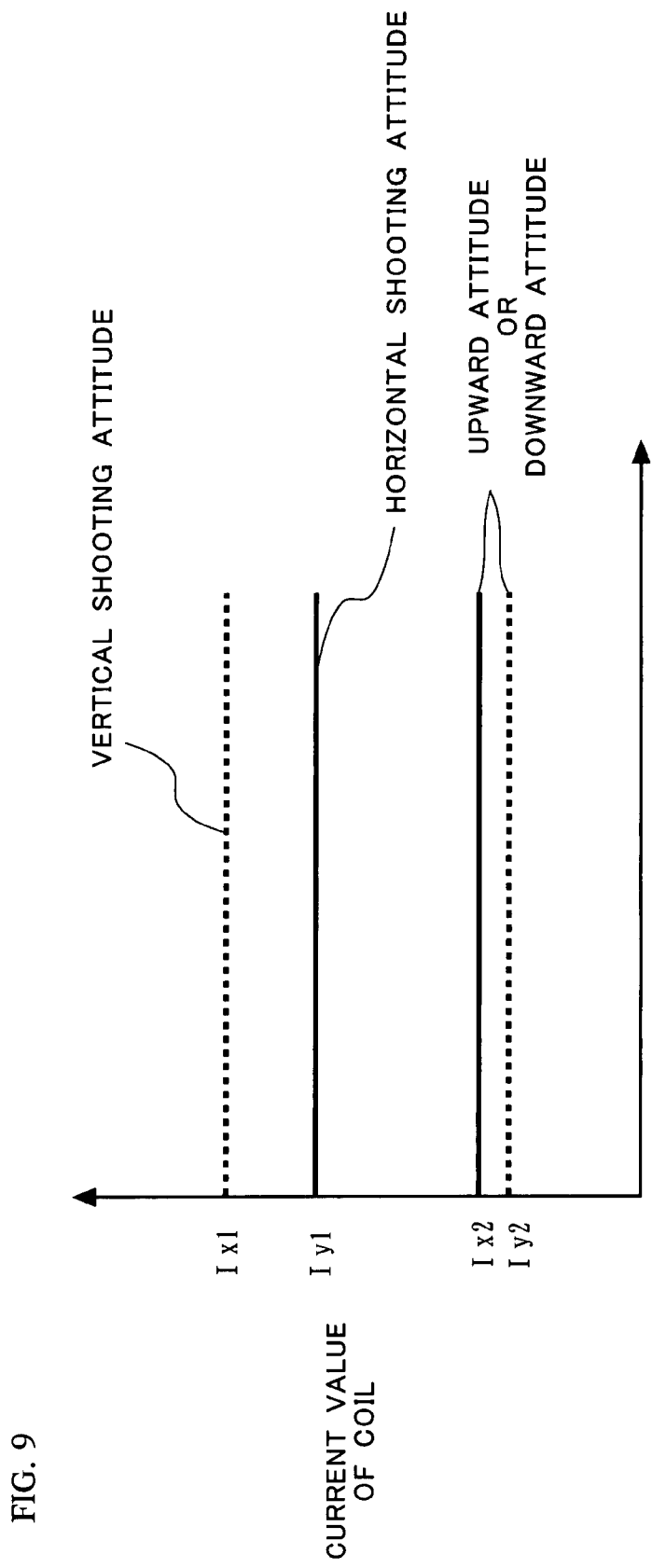
FIG. 9 is a diagram showing an amount of a current supplied to a coil of the image blurring compensation mechanism of the imaging device in each of the shooting attitudes according to embodiment 1 of the present invention.

In the case of a vertical shooting attitude 2 which is rotated by 180 degrees from a position as shown in FIG. 7(b), an absolute value of the current Ix1 passing through the coil 24x as shown in FIG. 9 hardly changes, and the polarity of the current Ix1 is inverted (changes from a positive value to a negative value). Accordingly, the vertical shooting attitude 2 which is rotated by −90 degrees from the horizontal shooting attitude is determined. In this state, the photographer presses the shutter operation section 36, and shoots the object. The shot image is recorded in the image recording section 12. In this case, the image recording control section 11 adds, to the image signal outputted from the buffer memory 9, an attitude determination signal 60(2), which indicates that the shooting attitude of the digital camera 1 is the vertical shooting attitude 2 rotated by −90 degrees from the horizontal shooting attitude around on the optical axis.

Accordingly, at the time of reproduction, the attitude determination signal 60 (2) recorded on the shot image is read, whereby an image having been shot in the vertical shooting attitude 2 is rotated by −90 degrees and displayed such that an orientation of an image to be displayed corresponds to an orientation of the image at the time of shooting with the digital camera 1 as shown in FIG. 11(b).

Figure 5:
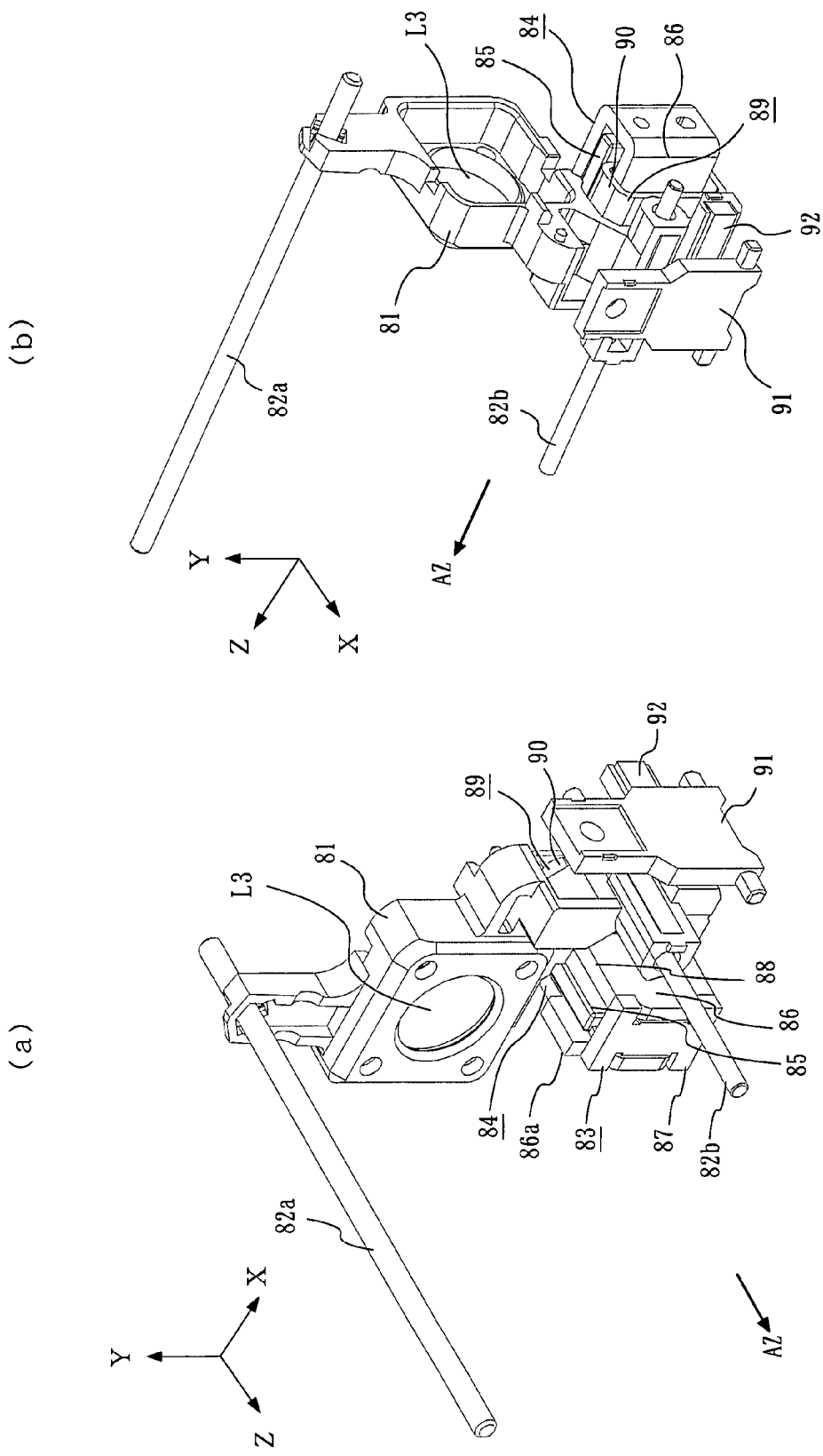
FIG. 5 is a perspective view showing a linear actuator of the imaging device according to embodiment 1 of the present invention.
Figure 6:
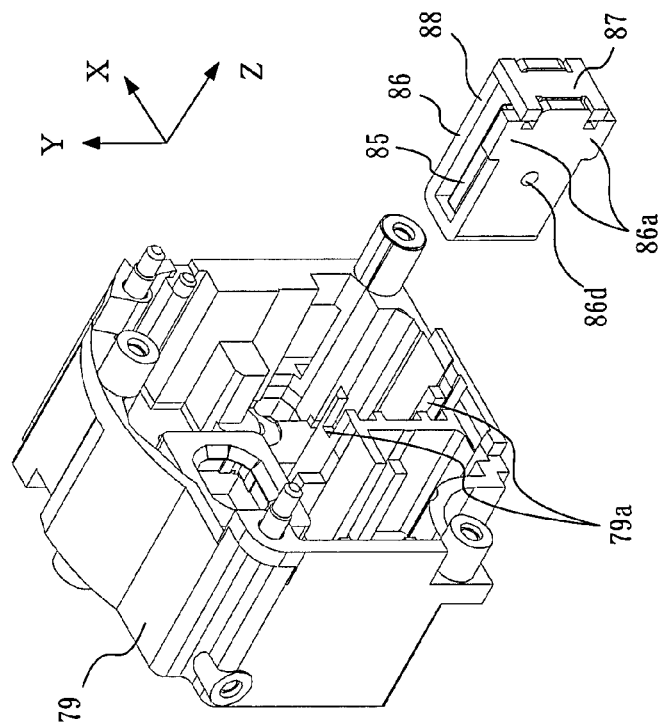
FIG. 6 is a perspective view of a yoke accommodating part of the linear actuator of the imaging device according to embodiment 1 of the present invention.
Figure 6:
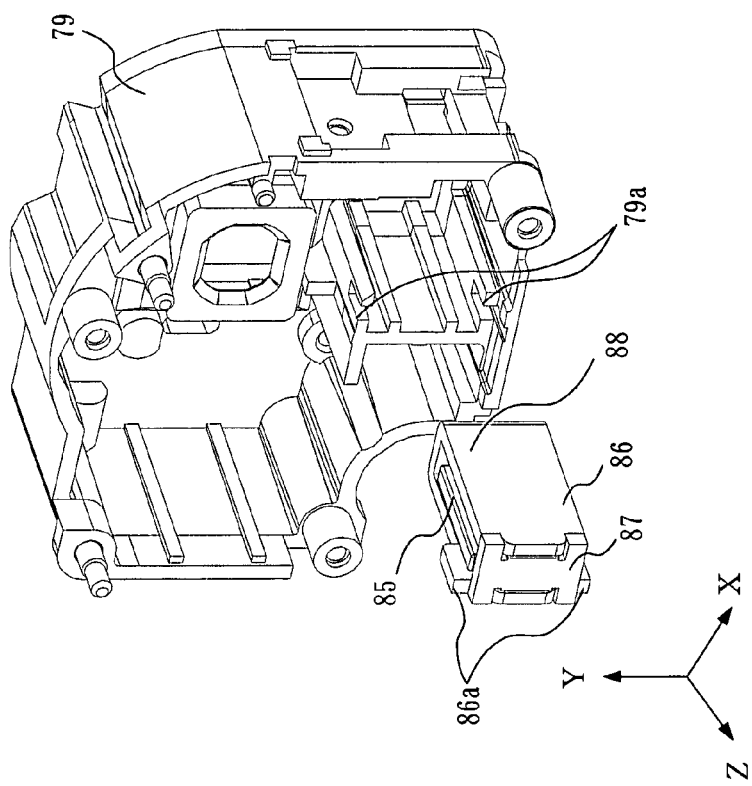

Next, with reference to FIGS. 5 and 6, a configuration of a focus lens drive actuator for driving the third lens unit L3 (focus lens unit) will be described. A focus lens holding frame 81 holds the third lens unit L3, and is situated in parallel with the optical axis AZ so as to slidably move in the optical axis AZ along guide poles 82a and 82b whose end portions are respectively fixed to a lens barrel (not shown). A stator 84 of a linear actuator 83, which drives the focus lens holding frame 81 in the optical axis AZ direction, is constituted of a main magnet 85 magnetized orthogonal to a driving direction (Z direction), a main yoke 86 of a U shape, and a side yoke 87 of a planar shape.

Further, two coupling protrusions 86a are provided at upper and lower portions of the main yoke 86 at the positive side of the Z direction of the main yoke 86, and formed so as to be coupled with protrusion accommodating portions 79a which are provided in a fixing frame 79 of the lens barrel. Further a magnetic circuit 88 including the stator 84 is formed so as to have a symmetrical shape (in the X direction) as viewed from the driving direction, and also so as to have an approximately symmetrical shape in the driving direction (the Z direction).

On the other hand, a coil 90, which is a component part of a movable element 89 of the linear actuator 83, is fixed to the focus lens holding frame 81 so as to provide a predetermined amount of space to the main magnet 85. A current is applied to the coil 90 so as to be orthogonal to a magnetic flux generated by the main magnet 85, whereby the focus lens holding frame 81 is driven in the optical axis AZ direction. A position detection means is formed by a magnetic scale 92, which is integrated with the focus lens holding frame 81, and a magnetic sensor 91 for detecting a signal of the magnetic scale 92.

Figure 12:
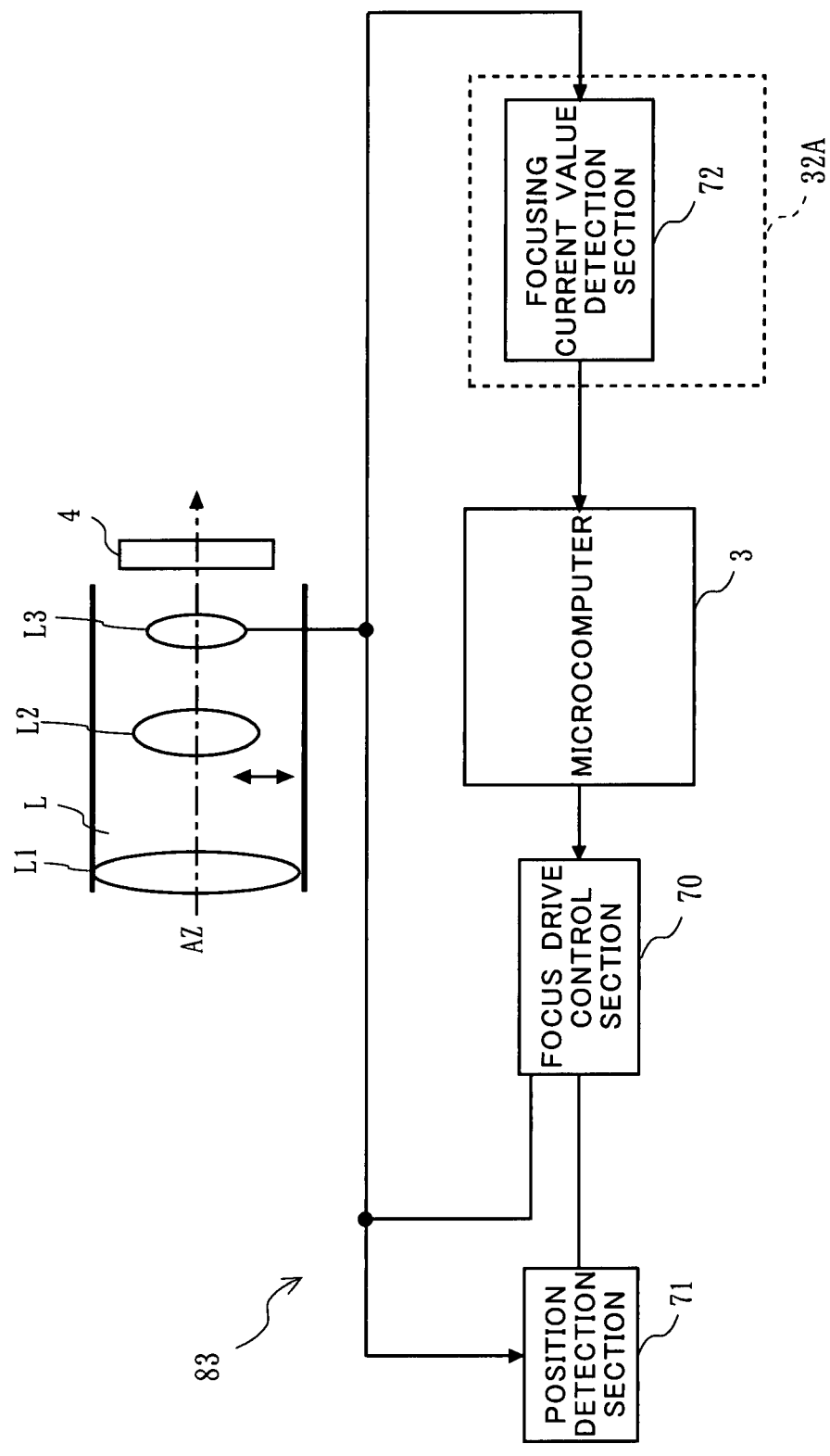
FIG. 12 is a block diagram showing a control system of a linear actuator of the imaging device according to embodiment 1 of the present invention.

Next, with reference to FIG. 12, a control system of a focusing device using the linear actuator 83 will be described. The third lens unit L3 is the focus lens unit used for focusing by moving parallel with the optical axis AZ. The third lens unit L3 is drive-controlled by the focus drive control section 70 along the Z direction which is parallel with the optical axis AZ. The position detection section 71 is a detection section for detecting a position of the third lens unit L3, and forms, in combination with the focus drive control section 70, a feedback control loop for controlling a movement of the third lens unit L3.

The shooting attitude detection section 32A includes a focusing current value detection section 72. The focusing current value detection section 72 detects a value of a current passing through a coil when the linear actuator 83 is actuated.

Figure 13:
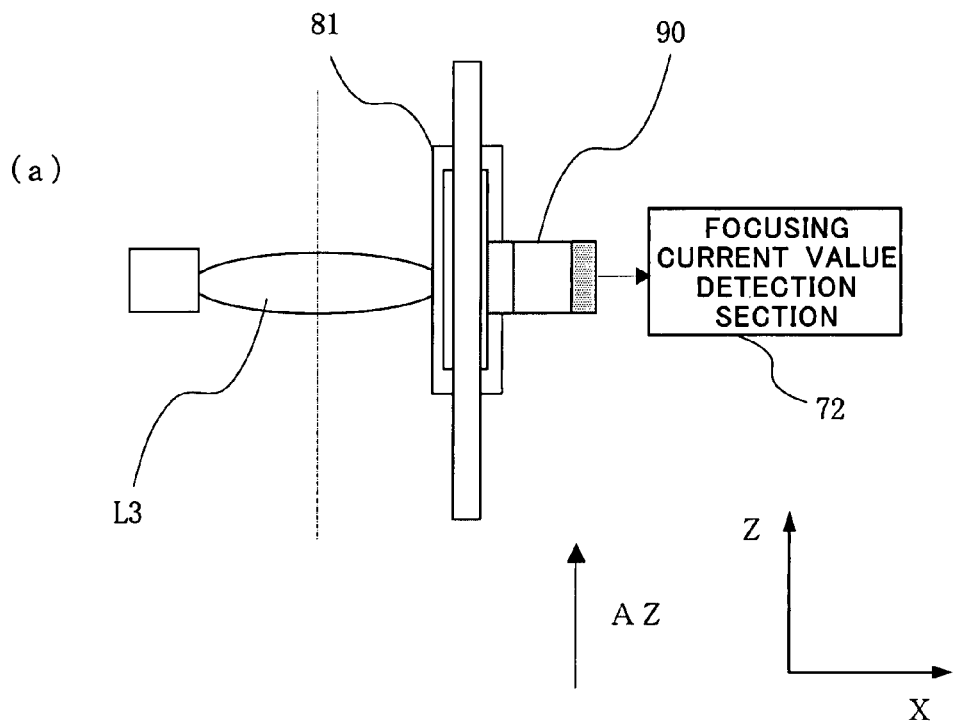
FIG. 13 is a diagram illustrating attitudes of the linear actuator of the imaging device according to embodiment 1 of the present invention.
Figure 13:
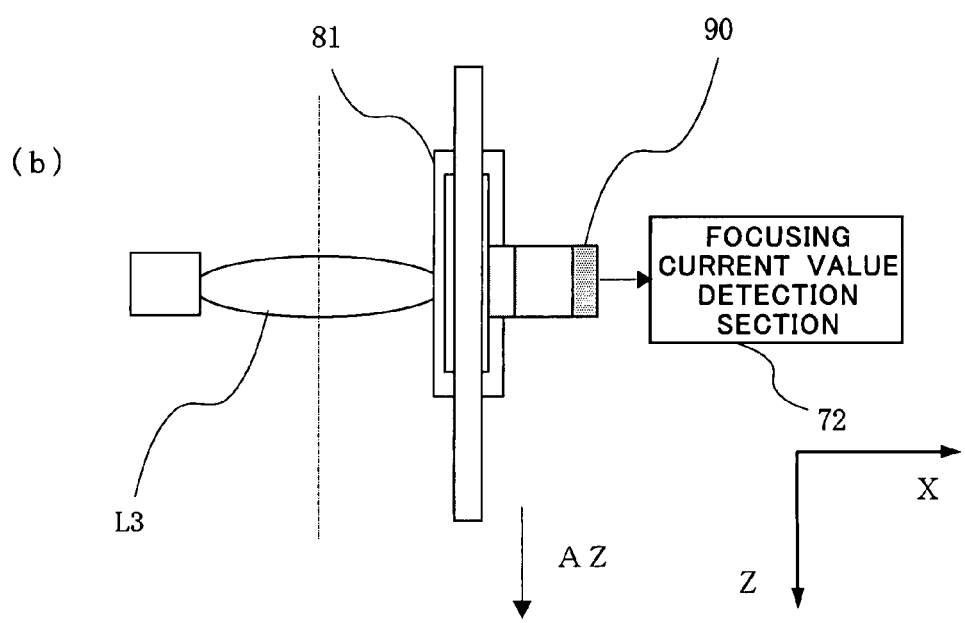
Figure 14:
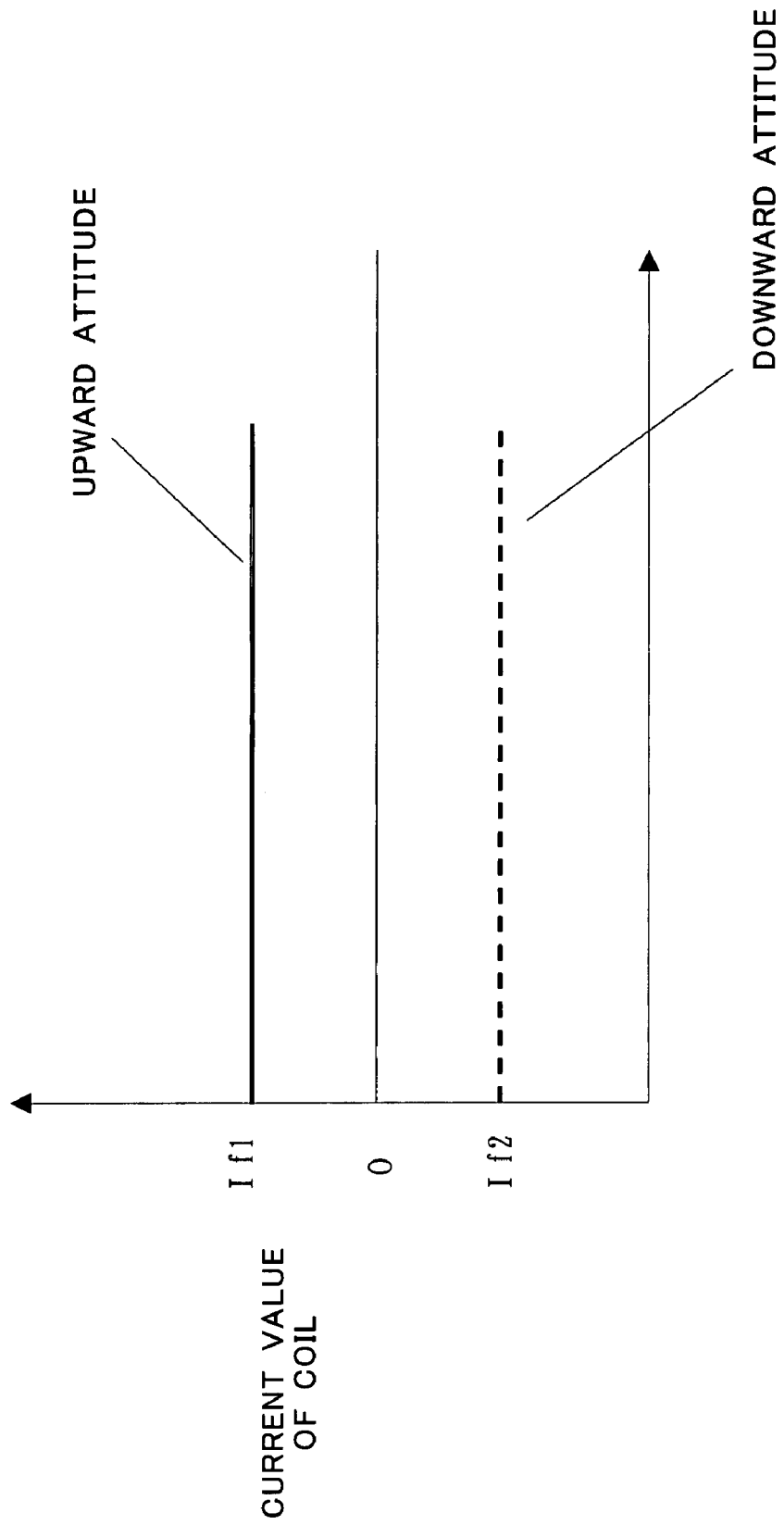
FIG. 14 is a diagram illustrating an amount of a current supplied to a coil of the linear actuator of the imaging device in each of the shooting attitudes according to embodiment 1 of the present invention.

With reference to FIGS. 13 and 14, a method of detecting a value of a current by using the focusing current value detection section 72 will be described. FIG. 13 shows attitudes of the linear actuator 83. That is, FIG. 13(a) shows an attitude of the linear actuator 83 at the time of shooting in an upward attitude, and FIG. 13(b) shows an attitude of the linear actuator 83 at the time of shooting in a downward attitude.

In the case of the upward attitude shown in FIG. 13(a), an weight of each of the third lens unit L3, the focus lens holding frame 81, and the coil 90 is applied to the −Z direction, which is the gravity direction. In this case, the third lens unit needs to be supported so as to be moved to a predetermined focus position. Therefore, an electromagnetic force needs to be generated so as to support a self-weight of the third lens unit L3. Accordingly, in order to generate a necessary electromagnetic force, a current If1 is supplied to the coil 90.

On the other hand, in the case of the downward attitude shown in FIG. 13(b), the weight of each of the third lens unit L3, the focus lens holding frame 81, and the coil 90 is applied to the Z direction, which is the gravity direction. In this case, the third lens unit needs to be supported so as to be moved to a predetermined focus position. Therefore, the electromagnetic force needs to be generated so as to support the self-weight of the third lens unit L3. Accordingly, in order to generate a necessary electromagnetic force, a current If2 is applied to the coil 90.

As above described, the value of the current passing through the coil 90 is determined depending on the shooting attitude of the digital camera 1. That is, the shooting attitude of the linear actuator 83 and the digital camera 1 can be determined by detecting an absolute value of the current passing through the coil 90. Accordingly, the linear actuator 83 drives the third lens unit L3, and also functions as means for detecting the upward attitude and the downward attitude of the digital camera 1.

Further, the shooting attitude of the digital camera 1 is determined as described below. In the case where a photographer is to shoot in an upward attitude, that is to shoot an airplane flying in the sky with a telephoto lens, the focusing current value detection section 72 detects the value of the current If1 passing through the coil 90 of the linear actuator 83. Based on the detected value of the current, the microcomputer 3 determines that the digital camera 1 is in the upward attitude. In this state, the photographer presses the shutter operation section 36, and shoots the object. An image having been shot is recorded in the image recording section 12.

On the other hand, in the case where the photographer is to shoot in a downward attitude, that is, to shoot a flower or the like with a microscope lens, the focusing current value detection section 72 detects the value of the current If2 passing through the coil 90 of the linear actuator 83. Based on the detected value of the current, the microcomputer 3 determines that the digital camera 1 is in the downward attitude. In this state, the photographer presses the shutter operation section 36, and shoots the object. Am image having been shot is then recorded in the image recording section 12.

Accordingly, the shooting attitude detection section 32A is capable of determining five attitudes of the digital camera 1, that is, the horizontal shooting attitude as shown in FIG. 7(a), the vertical shooting attitude 1 as shown in FIG. 7(b), the vertical shooting attitude 2 as shown in FIG. 7(c), the upward attitude as shown in FIG. 7(d), and the downward attitude as shown in FIG. 7(e).

Figure 15:
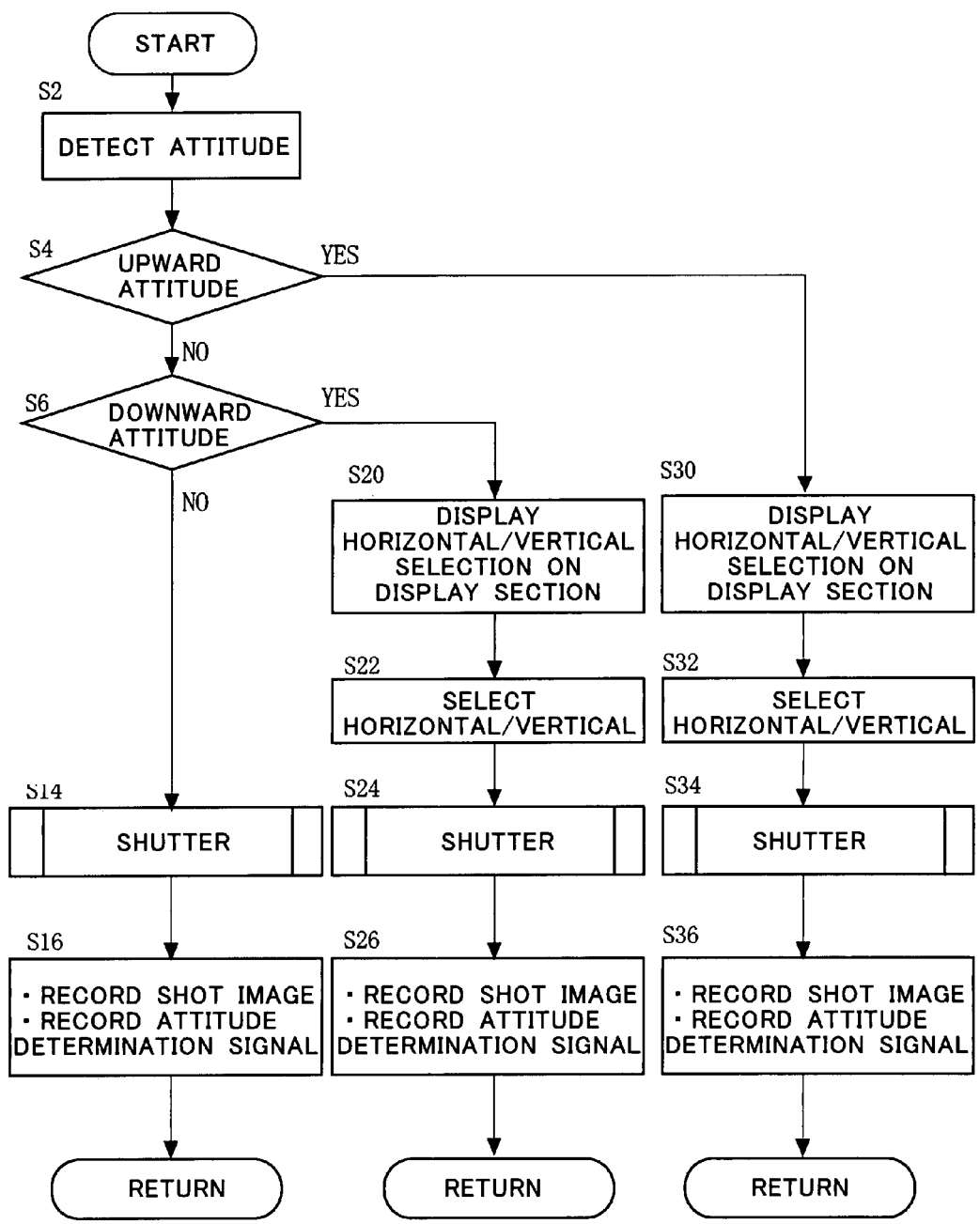
FIG. 15 is a flowchart illustrating an operation of the imaging device, from start of recording to end of recording, according to embodiment 1 of the present invention.

Hereinafter, with reference to a flowchart shown in FIG. 15, an operation of image shooting by using the imaging device constituted as above described will be described depending on the shooting attitudes. To start shooting, a photographer turns the power switch 350N, and holds the digital camera 1 in a predetermined attitude.

First, in step S2, the shooting attitude detection section 32A detects the attitude of the digital camera 1.

In step S4, determined is whether or not the shooting attitude is the upward attitude. In the case where the shooting attitude is the upward attitude, it is determined as YES, and control proceeds to step S30. On the other hand, in the case of anon-upward attitude, it is determined as NO, and the control proceeds to next step S6.

In step S6, determined is whether or not the shooting attitude is the downward attitude. In the case where the shooting attitude is the downward attitude, it is determined as YES, and the control proceeds to step S20. On the other hand, in the case the shooting attitude is not the downward attitude, it is determined as NO, and the control proceeds to step S14.

In step S14, in the case where the shutter operation section 36 is operated while the shooting attitude is neither in the upward attitude nor in the downward attitude, the microcomputer 3 transmits a command to the digital signal processing section 8. In response to the command having been received, the digital signal processing section 8 calculates an exposure value in accordance with a received image signal. The microcomputer 3 automatically sets a shutter speed appropriately in accordance with the calculated exposure value, whereby a light-measuring process ends. Further, the linear actuator 83 is driven such that a contrast value of the image signal reaches a peak, and a focusing process is performed. Accordingly, a distance-measuring process ends, and a given image is shot.

In step S16, in accordance with a command issued by the shooting attitude detection section 32A, any one of the attitude determination signals 60(0), 60(1), and 60(2) is recorded on a shot image. The shot image is then recorded in the image recording section 12.

Figure 16:
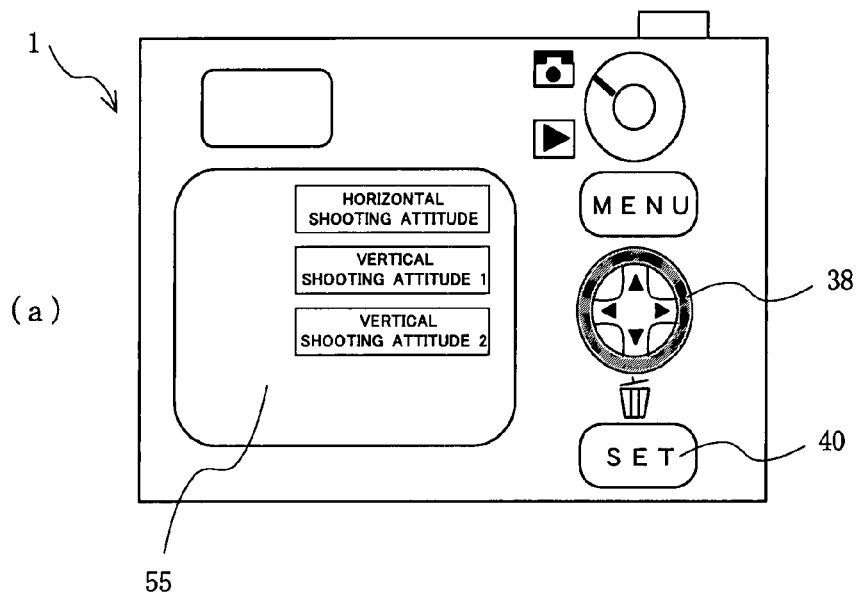
FIG. 16 is a diagram illustrating a menu for inputting a shooting method and a shooting attitude of the imaging device according to embodiment 1 of the present invention.
Figure 16:
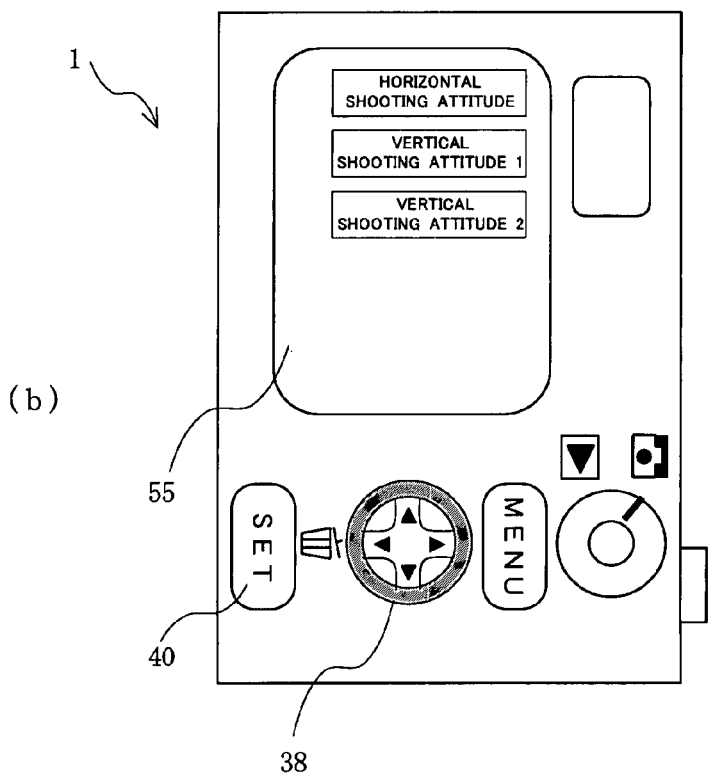

In step S30, that is, in above-described step S4, in the case where the upward attitude is detected, three menus as shown in FIG. 16 are displayed on the display section 55 of the digital camera 1 such that the photographer can select a current shooting attitude.

In step S32, the photographer selects any one from among the horizontal shooting attitude, the vertical shooting attitude 1, and the vertical shooting attitude 2 by using the cross operation key 38, and confirms such selection by using the SET operation section 40, whereby the attitude determination signal 60 indicative of a state of the current shooting attitude is temporarily stored in the buffer memory 9.

In the case where the menus shown in FIG. 16(a) are displayed in the vertical shooting attitude 1 or in the vertical shooting attitude 2, the menus to be displayed are also rotated and displayed as shown in FIG. 16(b), whereby it becomes easy for the photographer to select from the menus.

In step S34, when the shutter operation section 36 is operated, the microcomputer 3 transmits a command to the digital signal processing section 8. In response to the command having been received, the digital signal processing section 8 calculates an exposure value in accordance with a received image signal. The microcomputer 3 automatically sets the shutter speed appropriately in accordance with the calculated exposure value, whereby a light-measuring process ends. Further, the linear actuator 83 is driven such that a contrast value of the image signal reaches a peak, and a focusing process is performed. Accordingly, a distance-measuring process ends, and a given image is shot.

In step S36, the attitude determination signal temporarily stored in the buffer memory 9 is read, and any one of the attitude determination signals 60(0), 60(1) and 60(2) is recorded on a shot image. The shot image is then recorded in the image recording section 12.

In step S20, that is, in the case where the downward attitude is detected in above-described step S6, three menus as shown in FIG. 16 is displayed on the display section 55 of the digital camera 1 such that the photographer can select a current shooting attitude.

In step S22, the photographer selects anyone from among the horizontal shooting attitude, the vertical shooting attitude 1, and the vertical shooting attitude 2 by using the cross operation key 38, and confirm such selection by using the SET operation section 40, whereby the attitude determination signal 60 indicative of the current shooting attitude is temporarily stored in the buffer memory 9.

In step S24, when the shutter operation section 36 is operated, the microcomputer 3 transmits a command to the digital signal processing section 8. In response to the command having been received, the digital signal processing section 8 calculates an exposure value in accordance with a received image signal. The microcomputer 3 automatically sets the shutter speed appropriately in accordance with the calculated exposure value, whereby a light-measuring process ends. Further, the linear actuator 83 is driven such that a contrast value of the image signal reaches a peak, and a focusing process is performed. Accordingly, a distance-measuring process ends, and a given image is shot.

In step S36, the attitude determination signal temporarily stored in the buffer memory 9 is read, and any of the attitude determination signals 60(0), 60(1), and 60(2) is recorded on a shot image. The shot image is then recorded in the image recording section 12.

As above described, according to embodiment 1 of the present invention, the horizontal shooting attitude, two of the vertical shooting attitudes, the upward attitude, and the downward attitude of the digital camera body are detected. When the digital camera is in the horizontal shooting attitude or the vertical shooting attitude, a shooting operation thereof is controlled by using the attitude detection means of the image blurring compensation device. When the digital camera is in the upward attitude or in the downward attitude, a photographer can input the attitude of the digital camera. As a result, even if shooting is performed while the digital camera being held in the upward attitude or in the downward attitude, it is possible for both of an image shot in the horizontal shooting attitude and an image shot in the vertical shooting attitude each to make an orientation of the image at the time of shooting correspond to an orientation of the image at the time of displaying the shot image without a mistake.

Further, when the attitude of the digital camera is detected by using the image blurring compensation device and a linear focus actuator, it is not necessary to additionally arrange an attitude detection sensor or the like for detecting the attitude of the digital camera. Accordingly, it is possible to achieve reduction in the number of parts and costs. Further, in the case where the image blurring compensation device is mounted, it is possible to shoot an image free from blurring. By using the linear focus actuator, it is possible to realize a focus system which enhances a tracking capability and reduces power consumption.

An optical system is not necessarily integrated with the imaging device, an interchangeable optical system, that is, a so-called interchangeable lens system, may be adoptable. Even in such case, the image blurring compensation device may be integrated with the optical system, or may be embedded in the imaging device body.

Embodiment 2

Next, with reference to FIGS. 17 and 18, an imaging device according to embodiment 2 of the present invention will be described. In the present embodiment, although a digital camera 1 is constituted in the same manner as that described in embodiment 1, an operation thereof at the time of shooting is different.

Figure 17:
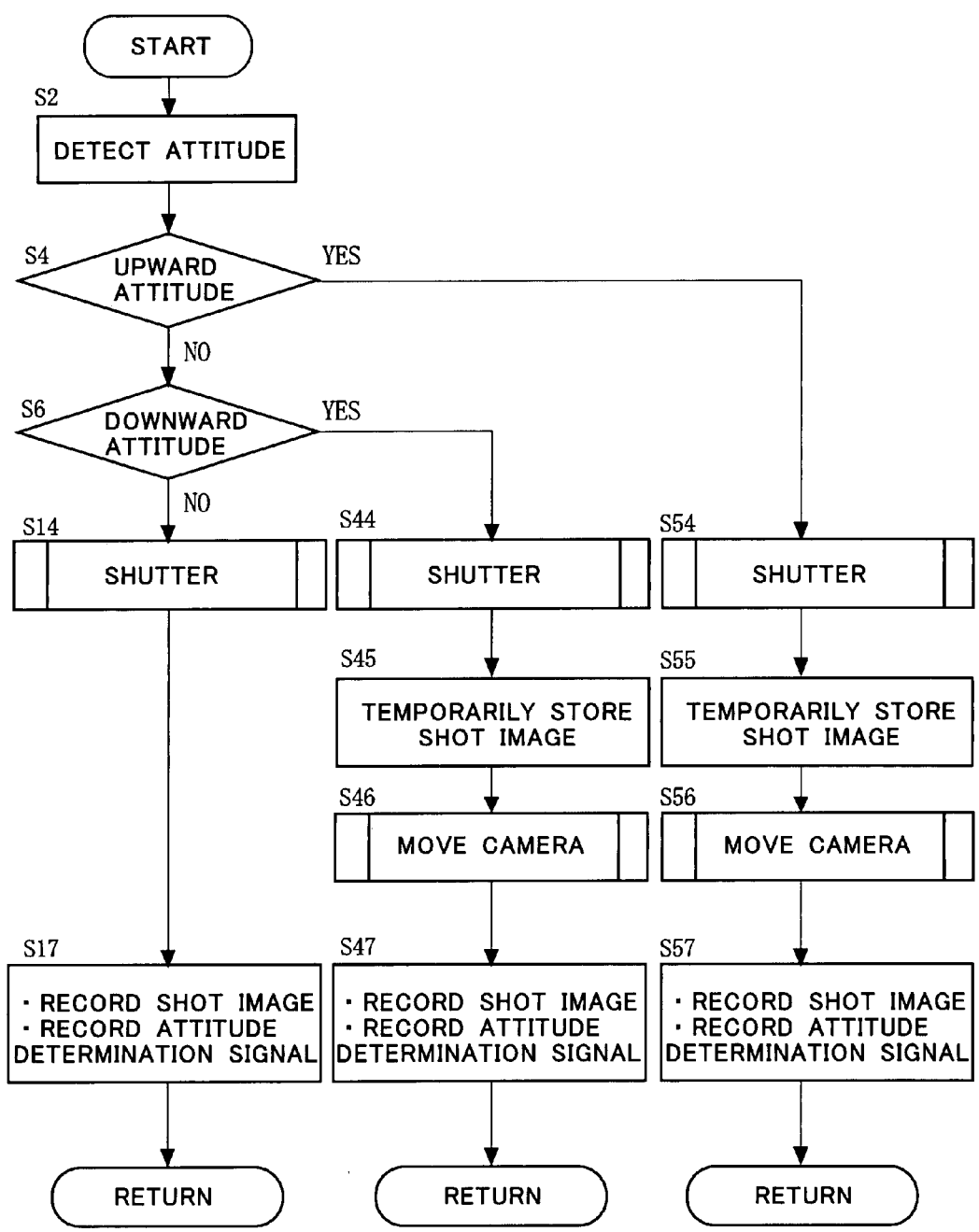
FIG. 17 is a flowchart illustrating an operation of an imaging device, from start of recording to end of recording, according to embodiment 2 of the present invention.

As shown in a flowchart of FIG. 17, in the case of the imaging device according to the present embodiment, when a photographer turns a power switch 350N and holds the digital camera 1 in a predetermined attitude at the time of shooting, a shooting attitude detection section 32A detects an attitude of the digital camera 1 in step S2.

Next, in step S4, determined is whether or not the detected attitude is an upward attitude. In the case of the upward attitude, it is determined as YES, and control proceeds to step S54. In the case of a non-upward attitude, it is determined as NO, and the control proceeds to step S6.

In step S6, determined is whether or not the detected attitude is a downward attitude. In the case of the downward attitude, it is determined as YES, and the control proceeds to step S44. In the case of not the downward attitude, it is determined as NO, and the control proceeds to step S14.

In step S14, that is, in the case where the shutter operation section 36 is operated while the digital camera 1 is held in neither the upward attitude nor the downward attitude, a microcomputer 3 transmits a command to a digital signal processing section 8. In response to the command having been received, the digital signal processing section 8 calculates an exposure value in accordance with a received image signal. The microcomputer 3 automatically sets a shutter speed appropriately in accordance with the calculated exposure value, whereby a light-measuring process ends. Further, the linear actuator 83 is driven such that a contrast value of the image signal reaches a peak, and a focusing process is performed. Accordingly, a distance-measuring process ends, and a given image is shot.

In step S17, in accordance with a command of a shooting attitude detection section 32A, any one of attitude determination signals 60(0), 60(1), and 60(2) is recorded on a shot image. The shot image is then recorded in an image recording section 12.

In step S54, that is, in the case where the upward attitude is detected, when a shutter operation section 36 is operated, the microcomputer 3 transmits a command to the digital signal processing section 8. In response to the command having been received, the digital signal processing section 8 calculates an exposure value in accordance with a received image signal. The microcomputer 3 automatically sets a shutter speed appropriately in accordance with the calculated exposure value, whereby a light-measuring process ends. Further, a linear actuator 83 is driven such that a contrast value of the image signal reaches a peak, and a focusing process is performed. Accordingly, a distance-measuring process ends, and a given image is shot.

In step S55, an image having been shot is temporarily stored in a buffer memory 9.

In step S56, in accordance with a movement of the digital camera 1, which is caused by the photographer, whether the digital camera 1 is in the horizontal shooting attitude or in the vertical shooting attitude is determined. Such determination process is performed on the grounds that it is common for a photographer to rotate and move the attitude of the digital camera 1 in a direction as shown with an arrow in FIG. 18 so as to confirm a shot image displayed on a display section 50, after completion of shooting. Specifically, as shown in FIG. 18(*a*), in the case of the upward attitude and the horizontal shooting attitude, after completion of shooting, the photographer rotates and moves the digital camera 1 shown with an arrow to a state shown in FIG. 18(*b*) so as to confirm the shot image. That is, the state shown in FIG. 18(*b*) is the horizontal shooting attitude.

In step S57, while the attitude of the digital camera 1 is being changed from a state shown in FIG. 18(*a*) to an attitude shown in 18(*b*), the attitude determination signal 60(0) is automatically recorded on the shot image temporarily stored in the buffer memory 9. In a similar manner, in the case where the digital camera 1 is in the vertical shooting attitude 1, the attitude determination signal 60(1) is automatically recorded, while the attitude of the digital camera 1 is being changed from a state shown in FIG. 18(*c*) to a state shown in FIG. 18(*d*). Further, in the case of the vertical shooting attitude 2, the attitude determination signal 60(2) is automatically recorded, although description thereof will be omitted.

In step S44, that is, in the case where the downward attitude is detected, when the shutter operation section 36 is operated, the microcomputer 3 transmits a command to the digital signal processing section 8. In response to the command having been received, the digital signal processing section 8 calculates an exposure value in accordance with a received image signal. The microcomputer 3 automatically sets the shutter speed appropriately in accordance with the calculated exposure value, whereby a light-measuring process ends. Further, the linear actuator 83 is driven such that a contrast value of the image signal reaches a peak, and a focusing process is performed. Accordingly, a distance-measuring process ends, and a given image is shot.

In step S45, the shot image is temporarily stored in the buffer memory 9.

In step S46, in the same manner as above-described step S56, in accordance with a movement of the digital camera 1, which is caused by the photographer, the attitude of the digital camera 1 is determined. That is, after completion of shooting, it is common that the attitude of digital camera 1 is rotated and moved in a direction as shown with an arrow in FIG. 18 so as to confirm a shot image displayed on the display section 50.

Therefore, in step S47, based on the same principle as described with respect to the case of the upward attitude, in the case of the horizontal shooting attitude, the attitude determination signal 60(0) is automatically recorded on a shot image temporarily stored in the buffer memory 9 while an angle of the digital camera 1 is being changed. In a similar manner, in the case of the vertical shooting attitude 1, the attitude determination signal 60(1) is automatically recorded, and in the case of the vertical shooting attitude 2, the attitude determination signal 60(2) is automatically recorded.

As above described, in addition to an effect described in embodiment 1, embodiment 2 of the present invention has an effect in which, even in the case of the upward attitude or the downward attitude, information indicative of whether the shooting attitude of the digital camera is in the horizontal shooting attitude or in the vertical shooting attitude is automatically determined without being inputted by the photographer, which leads to a further enhancement of usability.

It may be possible to set such that a function for determining the upward attitude or the downward attitude, as described in embodiments 1 and 2 does not actuate unless used by the photographer.

In present embodiments 1 and 2, although the shooting attitude is determined based on respective current values detected by the pitching current value detection section and the yawing current value detection section, the shooting attitude can be identified based on at least one of the current values. In this case, as described in embodiment 2, even if one of current value detection sections, i.e., the pitching current value detection section or the yawing current value detection section malfunctions, the shooting attitude can be determined accurately since both of the current values are detected.

In present embodiments 1 and 2, although the shooting attitude is determined based on the current value detected by each of the pitching current value detection section and the yawing current value detection section, determination of the shooting attitude is not limited thereto. For example, a similar effect can be obtained by measuring a voltage value. Further, in the case of detecting a linear actuator, without limiting to the current value, but the voltage value may be used.

In embodiments 1 and 2, the image blurring compensation device may be replaced with a dedicated angle detection sensor provided separately. Further, although the imaging device having one shutter operation section is adopted, it is not limited thereto. For example, a shutter operation section for shooting in a horizontal shooting attitude and a shutter operation section for shooting in a vertical shooting attitude are respectively and severally mounted, whereby the shooting attitude may be determined by using the shutter operation sections.

In present embodiments 1 and 2, although a case where a shot image is a still image has been described, a similar effect can be obtained with respect to a moving image or a simple moving image.

In present embodiments 1 and 2, although a method for adding signals (0) to (2) as the attitude determination signal has been adopted, it is not limited thereto. For example, a signal may be added only in the case of the vertical shooting attitude. Further, the attitude determination signal is not necessarily recorded on the shot image. The attitude determination signal may be recorded in a file other than the shot image so that the file of the attitude determination signal is associated with the shot image.

Further, in present embodiments 1 and 2, in the case where the upward attitude is detected, it is often the case that an airplane or the like is shot. Therefore, the linear actuator 83 may be caused to move automatically such that the third lens unit is moved so as to focus on an infinite position. On the other hand, in the case the downward attitude is detected, it is often the case that macro shooting such as shooting of a flower is performed. Therefore, the linear actuator 83 may be caused to move automatically such that the third lens unit is moved to a position for the macro shooting.

In present embodiments 1 and 2, although the upward attitude and the downward attitude are detected by using the linear actuator 83, it is possible to detect that the attitude is at least one of the upward attitude and the downward attitude by using image blurring compensation mechanism 20 only. That is, as shown in FIG. 8(*c*), in the case of the upward attitude, a self-weight of each of the pitching holding frame 21 and the yawing holding frame 22 need not be considered, and thus values of the currents Iy2 and Ix2 supplied to the coils 24y and 24x, respectively, are as shown in FIG. 9. In accordance with these values of the currents, whether the upward attitude or the downward attitude can be determined. Therefore, even in the case of shooting in the upward attitude or in the downward attitude, with the use of the single attitude detection means realized by image blurring compensation mechanism 20, it is possible for both of an image shot in the horizontal shooting attitude and an image shot in the vertical shooting attitude each to make an orientation of the image at the time of shooting correspond to an orientation of the image at the time of displaying the shot image without a mistake.

Shapes and configurations of the imaging optical system, the image blurring compensation device and the linear focus actuator are not limited to those described in embodiment 1 and embodiment 2 of the present invention. For example, in the imaging optical system, a positional configuration of the image blurring compensation lens unit and the focus lens unit may be determined arbitrarily in accordance with a specific optical design. Further, according to the image blurring compensation device described in embodiment 1 and embodiment 2 of the present invention, the coil is formed around the lens optical axis, the coil may be formed in a direction orthogonal to the lens optical axis.

Further, with regard to a method of determining the horizontal attitude, the vertical attitude, the upward attitude, and the downward attitude, the method is not limited to that described in each of embodiment 1 and embodiment 2 of the present invention. That is, in embodiment 1 and embodiment 2 of the present invention, a method of detecting the horizontal attitude and the vertical attitude by using two actuators of the image blurring compensation device and also detecting the upward attitude and the downward attitude by using the linear actuator is adopted. However, an alternative method may be adopted. As an exemplary alternative method, actuators may be applied to a lens barrel such that the horizontal shooting attitude and the vertical shooting attitude are detected by using one of the two actuators of the image blurring compensation device and the linear actuator, and the upward attitude and the downward attitude are detected by using the other actuator of the image blurring compensation device.

INDUSTRIAL APPLICABILITY

An imaging device, a display control apparatus and a display apparatus of the present invention are applicable to a digital still camera, a digital video camera, a camera-equipped cellular phone and the like which are required for a satisfactory shot image display.

The invention claimed is:

1. An imaging device for outputting an optical image of an object as an electrical image signal, comprising:
    an imaging optical system for generating the optical image of the object;
    an imaging sensor for receiving the optical image generated by the imaging optical system and converting the optical image into the electrical image signal;
    a first attitude detection section for detecting whether the imaging device is in a horizontal attitude or in a vertical attitude, and generating an attitude determination signal;
    a second attitude detection section for detecting whether the imaging device is in an upward attitude or in a downward attitude at the time of shooting;
    an image recording section for recording the attitude determination signal together with a shot image outputted from the imaging sensor; and
    a display section for displaying the shot image, wherein
    when it is determined, based on the detection result of the second attitude detection section, that the imaging device is either in the upward direction or in the downward direction, the first attitude detection section automatically detects, after shooting is performed by the imaging device and after the imaging device becomes in an attitude other than an upward attitude and a downward attitude and when the shot image is displayed on the display section for confirmation, whether the imaging device is either in the horizontal attitude or in the vertical attitude and generates the attitude determination signal, and
    the attitude determination signal, which is generated by the first attitude detection section after shooting by the imaging device, is recorded in the image recording section together with the shot image.

2. The imaging device according to claim 1, further comprising,
    an image blurring compensation device for detecting vibration applied to the imaging device, and driving a compensation lens of the imaging optical system in two directions which are orthogonal to an optical axis, wherein
    the first attitude detection section determines an attitude of the imaging device in accordance with a signal for driving the compensation lens.

3. The imaging device according to claim 2, wherein
    the image blurring compensation device includes a first actuator and a second actuator for driving the compensation lens in the two directions which are orthogonal to the optical axis, and
    the first attitude detection section determines the attitude of the imaging device in accordance with a value of a driving current of at least one of the first actuator and the second actuator.

4. The imaging device according to claim 1, further comprising,
    a linear actuator for driving a focus lens unit, wherein
    the second attitude detection section determines the attitude of the imaging device in accordance with a signal for driving the focus lens unit.

5. The imaging device according to claim 1, wherein, when the imaging device is in the upward attitude, a focus lens unit is moved so as to focus on an infinite position.

6. The imaging device according to claim 1, wherein, when the imaging device is in the downward attitude, a focus lens unit is moved to a position for a macro shooting.

* * * * *